(12) United States Patent
Wei et al.

(10) Patent No.: US 9,614,581 B2
(45) Date of Patent: Apr. 4, 2017

(54) CONTROL AND MANAGEMENT OF POWER SAVING LINK STATES IN VECTORED TDD TRANSMISSION SYSTEMS

(71) Applicant: Futurewei Technologies, Inc., Plano, TX (US)

(72) Inventors: Dong Wei, Austin, TX (US); Jie Lv, Shenzhen (CN); Jianhua Liu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 428 days.

(21) Appl. No.: 14/204,666

(22) Filed: Mar. 11, 2014

(65) Prior Publication Data

US 2014/0254791 A1    Sep. 11, 2014

Related U.S. Application Data

(60) Provisional application No. 61/776,479, filed on Mar. 11, 2013.

(51) Int. Cl.
*H04B 3/32* (2006.01)
*H04B 1/401* (2015.01)
*H04M 11/06* (2006.01)

(52) U.S. Cl.
CPC ............. *H04B 3/32* (2013.01); *H04B 1/401* (2013.01); *H04M 11/062* (2013.01); *Y02B 60/36* (2013.01)

(58) Field of Classification Search
None
See application file for complete search history.

(56) References Cited

U.S. PATENT DOCUMENTS

| | | | | |
|---|---|---|---|---|
| 2009/0086798 A1* | 4/2009 | Zukunft | ............... | H04L 12/10 375/222 |
| 2012/0236856 A1* | 9/2012 | Joffe | ............... | H04B 10/2504 370/390 |
| 2013/0058237 A1* | 3/2013 | Schoppmeier | ....... | H04L 1/0002 370/252 |
| 2014/0056312 A1* | 2/2014 | Strobel | ............... | H04J 3/0647 370/459 |

(Continued)

OTHER PUBLICATIONS

"Series G: Transmission Systems and Media, Digital Systems and Networks; Digital sections and digital line system—Access networks; Asymmetric digital subscriber line transceivers 2 (ADSL2)," ITU-T G.992.3 (Jul. 2002), 312 pgs.

(Continued)

*Primary Examiner* — Fan Tsang
*Assistant Examiner* — Jeffrey Lytle
(74) *Attorney, Agent, or Firm* — Conley Rose, P.C.

(57) ABSTRACT

An apparatus comprising a first transceiver unit (TU) for coupling to a first subscriber line, at least one next TU for coupling to at least one next subscriber line, and a processor coupled to the first TU and the at least one next TU, wherein the processor is configured to determine a link state in which data transmission is disabled for the duration of one or more symbols in a superframe, instruct the first TU to operate in the determined link state, and coordinate data transmission by the first TU and the at least one next TU to avoid an increase of crosstalk from the first line to the at least one next subscriber line due to the first TU operating in the determined link state.

30 Claims, 12 Drawing Sheets

(56) References Cited

U.S. PATENT DOCUMENTS

| | | | | |
|---|---|---|---|---|
| 2014/0119250 A1* | 5/2014 | Sorbara | .................... | H04L 5/14 370/294 |
| 2014/0205082 A1* | 7/2014 | Nuzman | .................. | H04B 3/32 379/406.06 |
| 2015/0215059 A1* | 7/2015 | Kerpez | ................ | H04M 11/062 379/406.01 |
| 2015/0256311 A1* | 9/2015 | Oksman | .................. | H04L 47/10 370/468 |

OTHER PUBLICATIONS

"Series G: Transmission Systems and Media, Digital Systems and Networks; Digital sections and digital line system—Access networks; Asymmetric Digital Subscriber Line (ADSL) transceivers—Extended bandwith ADSL2 (ADSL2+)," ITU-T G.992.5 (May 2003), 92 pgs.

"Draft Recommendation ITU-T G.9701 (for AAP, Jan. 16, 2014)," International Telecommunication Union, Telecommunication Standardization Sector, Study Group 15, TD 159 Rev. 2 (PLEN/15), Jan. 2014, 285 pgs.

Chang, C., "G.fast: Low power modes," ITU—Telecommunication Standardization Sector, Temporary Document, 2012-06-4a-070, Study Group 15, Jun. 2012, 2 pages.

Humphrey, L., "G.fast Low power modes," ITU—Telecommunication Standardization Sector, Temporary Document 2013-01-Q4-045, Study Group 15, Jan. 28-Feb. 1, 2013, 3 pages.

Brown, L., "G.fast: Updated Issues List for G.fast," International Telecommunication Union, Study Group 15, TD 642 Rev.1 (WP 1/15), Study Period 2009-2012, Dec. 5-16, 2011, 15 pages.

Oksman, V., et al., "G.fast: Precoder update in support of discontinuous operation," ITU—Telecommunication Standardization Sector, Study Group 15, Temporary Document 2013-01-Q4-068, Jan. 28-Feb. 1, 2013, 7 pages.

* cited by examiner

US 9,614,581 B2

CONTROL AND MANAGEMENT OF POWER SAVING LINK STATES IN VECTORED TDD TRANSMISSION SYSTEMS

CROSS-REFERENCE TO RELATED APPLICATIONS

The present application claims priority to U.S. Provisional Patent Application No. 61/776,479 filed Mar. 11, 2013 by Dong Wei et al. and entitled "A Method for Control and Management of Power Saving Link States in Vectored TDD Transmission Systems", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide large bandwidth for digital communications over existing subscriber lines. DSL includes a family of technologies such as Asymmetric DSL (ADSL), Asymmetric DSL 2 (ADSL2), Asymmetric DSL 2 Plus (ADSL2+), Very High Speed DSL 2 (VDSL2). G.fast is a new DSL technology, which is being developed by the International Telecommunication Union Telecommunication Standardization Sector (ITU-T), and G.fast is the ITU-T project name. Some DSL technologies, such as ADSL, VDSL, and G.fast, may use a discrete multi-tone (DMT) line code that allocates a plurality of bits for each sub-carrier or tone in each DMT symbol. Instead of using frequency-division duplexing (FDD) in legacy DSL systems, G.fast may use synchronous time-division duplexing (STDD), which may indicate that upstream (US) and downstream (DS) DMT symbols are transmitted in different time slots. Further, in STDD data symbols for different subscriber lines in a vectored group of subscriber lines may be synchronized.

In practice, many DSL customers may be used to DSL links that are always ready and DSL modems that are always on. Statistically, a DSL link may be idle most of time, during which power is wasted. Power saving states may be designed such that the transceivers can reduce their power consumption.

SUMMARY

In one embodiment, the disclosure includes an apparatus comprising a first transceiver unit (TU) for coupling to a first subscriber line, at least one next TU for coupling to at least one next subscriber line, and a processor coupled to the first TU and the at least one next TU, wherein the processor is configured to determine a link state in which data transmission is disabled for the duration of one or more symbols in a superframe, instruct the first TU to operate in the determined link state, and coordinate data transmission by the first TU and the at least one next TU to avoid an increase of crosstalk from the first line to the at least one next subscriber line due to the first TU operating in the determined link state.

In another embodiment, the disclosure includes a method for power management implemented by a network device, the network device comprising a plurality of time-division duplexing (TDD) TUs for coupling to a plurality of subscriber lines, the method comprising determining a power management state in which the at least one of the TUs should not transmit data for the duration of one or more symbols in a superframe, and updating vectoring coefficients used by the TUs to avoid an increase of far end crosstalk (FEXT) among the plurality of subscriber lines due to transitioning of the at least one of the TUs to the power management state.

In yet another embodiment, the disclosure includes a Distribution Point Unit (DPU) comprising a plurality of G.Fast Transceiver Units on a network side (FTU-Os) for coupling to a vectored group of subscriber lines, wherein the FTU-Os are configured to operate in a discontinuous operation interval during which not all data symbol positions available are used by the FTU-Os to transmit data onto the vectored group of subscriber lines, and a Vectoring Control Entity (VCE) configured to adjust crosstalk cancellation matrices for the FTU-Os during the discontinuous operation interval based on a number of subscriber lines containing data symbols.

In yet another embodiment, the disclosure includes a method implemented by a DPU comprising an FTU-O coupled to a subscriber line, the method comprising determining a first number of symbol positions in which the FTU-O should be active and a second number of symbol positions in which the FTU-O should be inactive, wherein the first number of symbol positions and the second number of symbol positions belong to one or more TDD frames of a superframe, transmitting data, by the FTU-O, onto the subscriber line in the first number of symbol positions, and keeping at least part of the FTU-O turned off such that the FTU-O does not transmit data onto the subscriber line in the second number of symbol positions.

In yet another embodiment, the disclosure includes a network system comprising a TDD transmission system that comprises a plurality of FTU-Os for coupling to a vectored group of subscriber lines, wherein the TDD transmission system is configured to determine a link state that specifies one or more active symbol positions and inactive symbol positions for at least one FTU-O, and transition, without directly causing an increase of FEXT among the vectored group of subscriber lines, the at least one FTU-O to the link state in which data is transmitted during the active symbol positions but not the inactive symbol positions in a superframe, and a customer premise equipment (CPE) for coupling to one of the vectored group of subscriber lines, wherein the CPE is configured to receive data from the at least one transmitter during the active symbol positions but not the inactive symbol positions in the superframe.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
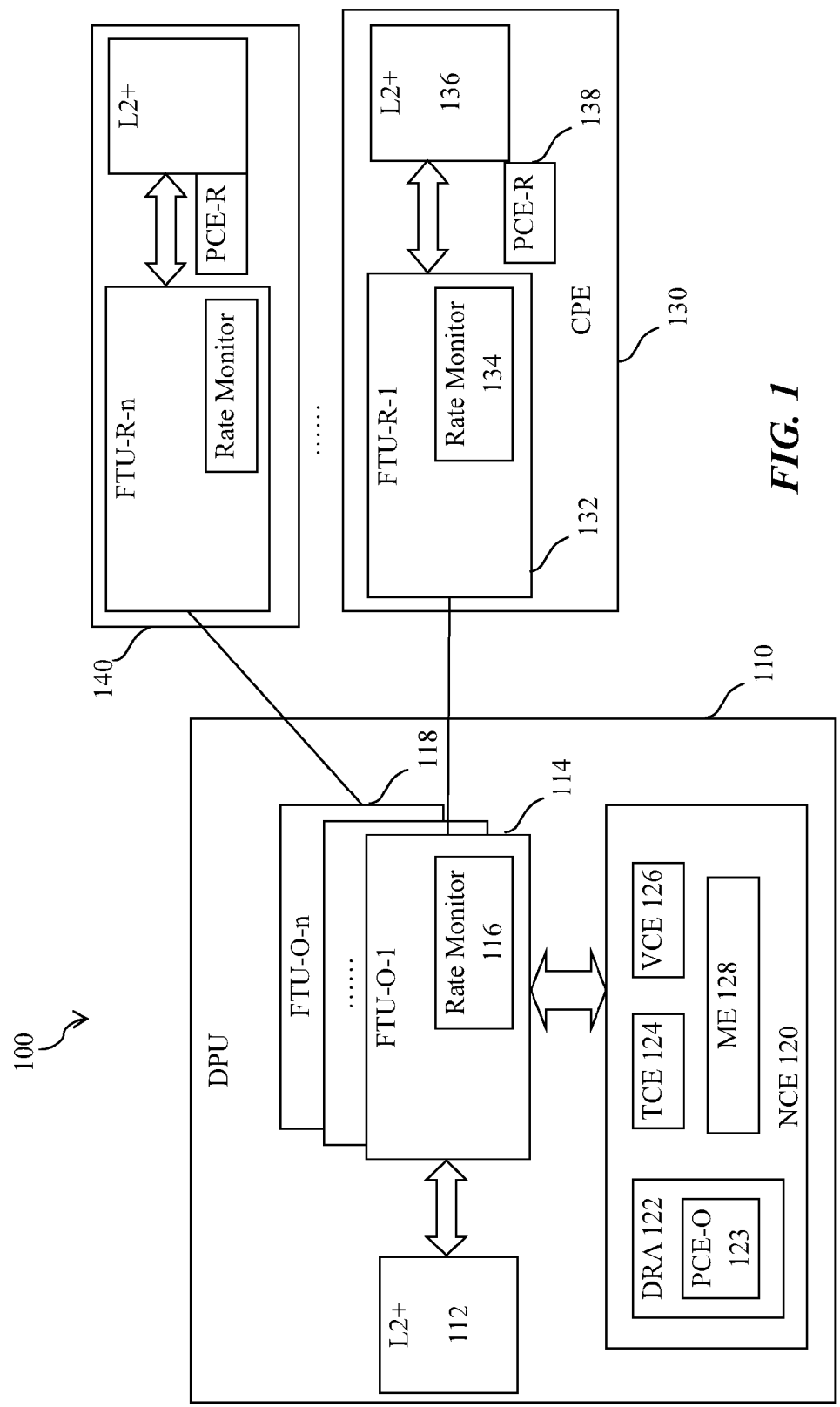
FIG. 1 is a schematic diagram of an embodiment of a reference model of a DSL communication system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Telephone binder cables may contain, for example, between 10 and 50 subscriber lines such as unshielded copper twisted pairs. Due to variations in manufacturing and imperfect cable installation, sometimes relatively significant levels of far-end crosstalk (FEXT) may occur between each twisted pair within a binder (and between adjacent binders). An advanced signal processing technique called "vectoring" may cancel FEXT among a vectored group of subscriber lines, such as between twisted pairs within copper telephone cables and permit dramatically higher data rates. G.fast uses vectoring techniques to cancel FEXT.

DSL technologies, including ADSL, ADSL2, VDSL2, and G.fast, may provide increasingly higher rates. The lengths of the subscriber lines from subscriber home to DSL access multiplexer (DSLAM) may become increasingly shorter. An aggregate transmit powers may be relatively low, and the power of digital signal processing (DSP) may be relatively high. When power management states (sometimes referred to as power saving states) are designed, not only the power of analog components such as line drivers but also the power of digital components such as DSP may be taken into account. Loop lengths from a distribution point unit (DPU) to subscriber homes may be within 250 meters. Thus, it may be desirable that a time-division duplexing (TDD) transmission system at the DPU consumes significantly less power than legacy DSL transceivers. It is hoped that not only the power consumption of a line driver but also the power consumption of DSP can be reduced in power saving states of the DPU.

Embodiments disclosed herein teach power saving solutions for TDD communication systems such as those compliant to G.fast. For example, in a transmission system comprising a plurality of transceiver units (TUs), the power saving solutions disclosed herein may help save not only the power consumption of analog modules such as an analog front end (AFE) and a line driver but also power consumption of digital modules such as a DSP. In an embodiment, a transmission system disclosed herein have at least three power management states, which may comprise a normal operation mode, one or more power saving states for low rate or reduced power supply, and an idle mode. Systems in the one or more power saving states may be in discontinuous operation, where discontinuous operation means that not all of the transmission opportunities, e.g., represented or indicated by data symbol positions in a superframe, available for data transmission are used by TUs to transmit user data (in short as data). A line driver and/or a DSP may be in a sleep mode or frozen in the unused transmission opportunities or symbol positions for data transmission, and the line driver and/or DSP may be woken up or unfrozen for the used available time for data transmission.

For a DPU comprising multiple TUs coupled to a vectored group of lines, the disclosed embodiments may coordinate data transmission by the TUs to avoid an increase of crosstalk from one subscriber line to another due to link state transitions. Such coordination may help stabilize system performance. For example, disclosed embodiments may control the transitions of a line among different power management states by cooperation with other lines in the same vector group. In an embodiment, crosstalk cancellation coefficients may be updated with synchronization to state transitions in order to remove the impact, e.g., in terms of signal to noise ratio (SNR), of state transition on other lines.

FIG. 1 illustrates an embodiment of a reference model of a DSL communication system 100, wherein disclosed power saving solutions may be implemented. Depending on the supported standard, the DSL communication system 100 may be referred to as an xDSL system, where 'x' may indicate any DSL standard. For instance, 'x' stands for 'A' in ADSL2 or ADSL2+ systems, and 'x' stands for 'V' in VDSL or VDSL2 systems. When a transceiver unit (TU) in the DSL communication system 100 is located on a network side (e.g., in a DPU, central office, exchange, or cabinet), the TU may be referred to as an xTU-O. On the other hand, when a TU in the DSL system 100 is located at a remote or user end such as a customer premise, the TU may be referred to as an xTU-R.

As shown in FIG. 1, the DSL communication system 100 is a G.fast system, thus a TU may be referred to as a G.fast transceiver unit on a network end (FTU-O). Similarly, in the G.fast system, a CPE transceiver may be referred to as a G.fast transceiver unit on a remote end (FTU-R). It should be understood that although the present disclosure mainly use components compliant to the G.fast standard as an example (e.g., notations FTU-O and FTU-R used extensively), embodiments disclosed herein are generally applicable to various DSL systems and are not limited to G.fast by any means.

The DSL communication system 100 comprises a Distribution Point Unit (DPU) 110 and a plurality of CPEs (e.g., CPEs 130 and 140) coupled to the DPU 110 via subscriber lines. On the network side, the DPU 110 may comprise various units or modules including a layer 2 plus (L2+) module, a plurality of transceiver units denoted as FTU-O-1 to FTU-O-n (e.g., FTU-Os 114 and 118), and a node control entity (NCE) 120 arranged as shown in FIG. 1. The DSL communication system 100 may be deployed in a Fibre-to-the-Distribution-Point (FTTdp) scenario.

The combination of FTU-Os in the DPU 110 may be referred to as a transmission system, or simply as an FTU-O module. Sometimes the whole DPU 110 may be referred to as an FTU-O module. On the consumer premise side, each CPE such as the CPE 130, taken as an example, may comprise various modules including an FTU-R 132, an L2+ module 136, and a PCE on a remote side (PCE-R) 138 arranged as shown in FIG. 1. Further, each FTU-R such as the FTU-R 132, taken as an example, may comprise a rate monitor 134.

In operation, each FTU-O and its corresponding FTU-R may work as a pair to realize data transmission and reception in upstream and downstream directions. For example, the FTU-O 114 is located inside the DPU 110 at the network side of a wire pair (U-O reference point), while its corresponding FTU-R 132 is located inside the CPE 130, sometimes referred to as a Network Termination (NT), at the customer premises side of the wire pair (U-R reference point).

The DPU 110 is located at a distribution point and may contain one or more FTU-O transceivers, with each FTU-O transceiver connected to an NT at the customer side. The management of the DPU 110 may be performed by a network management system (NMS). The NMS passes management information to the DPU's NCE 120 over a Q reference point. The L2+ blocks 112 and 136 represent the Layer 2 and above functionalities contained in the DPU 110 and the CPE 130. The DPU 110 and the CPE 130 may also comprise physical layer (PHY) blocks that represent the physical layer of transceivers.

In G.fast, a common element of many forms of coordination is synchronous and coordinated transmission of signals, or synchronous and coordinated reception of signals from N wire pairs connected to an FTU-O module (i.e., the coordinated group). Thus, the signals may be represented as a vector where each component is a signal on one of the lines.

The NCE 120 may implement control and management of power saving state transitions. One of ordinary skill in the art will understand that modules, blocks, or units used in the DSL communication system 100 can be flexibly implemented or deployed. For example, the NCE 120 may be coupled to an FTU-O module or reside in an FTU-O module. In an embodiment, the NCE 120 refers to a combination or union of multiple functional modules including one or more of a Dynamic Resource Allocation (DRA) module 122, a Timing Control Entity (TCE) 124, a Vectoring Control Entity (VCE) 126, and a management entity (ME) 128. The DRA 122 may further comprise a Power Control Entity (PCE) on the network side (PCE-O) 123.

For each FTU-O in the coordinated group, a data plane information flow over a $\gamma_O$ reference point may be represented by a single downstream data stream (STREAMds-n) and a single upstream data stream (STREAMus-n). For example, the FTU-O 114 may use flow control (FCTLds-n) on the downstream data stream. The L2+ entity or module 112 may use flow control (FCTLus-n) on the upstream data stream. The ME 128 may convey management information (over an interface here called γ-m) to each FTU-O such as the FTU-Os 114 and 118.

The TCE 124 may coordinate data transmission and reception with synchronous time-division duplexing (STDD) over the coordinated group. At a U-O reference point, downstream symbols transmitted by N FTU-Os, upstream symbols transmitted by N FTU-Rs, and super-frame delimiter symbols may be aligned over N wire pairs in the coordinated group. The coordination may be a same TDD-timing being passed from the TCE 124 to N FTU-Os located inside the DPU 110. The TCE 124 may further pass network timing reference (NTR) and time of day (ToD) information to the N FTU-Os for distribution over the coordinated group. The TCE 124 may synchronize the TDD-timing (including a transceiver sample clock $f_s$) to the NTR and/or ToD. The ME 128 may convey management information (over an interface here called TCE-m) to the TCE 124.

The VCE 126 may coordinate crosstalk cancellation over the coordinated group. The coordination is made possible through an internal interface between an FTU-O (e.g., FTU-O-1 114) and other FTU-Os (here called FTU-O-n, n=2 . . . N), which is here called ϵ-1-n to indicate that the coordination takes place between line 1 and line n. Coordination data (e.g., precoder data for vectoring) may be exchanged between FTU-O-n1 and FTU-O-n2 over an interface here called ϵ-n1-n2. Each VCE controls a single FTU-O module, and controls FTU-O-n (connected to line n) over an interface here called ϵ-c-n (e.g., to set precoder coefficients for vectoring). Information contained in a backchannel (STREAM-BC-n) enables the VCE 126 to determine precoder coefficients. The backchannel information may be conveyed from the FTU-R 132 to the VCE 126 over the γR, U-O, U-R, and γO reference points. Inside the NCE 120, the ME 128 may convey the management information (over an interface here called ϵ-m) to the VCE 126.

The DRA 122 may coordinate downstream and upstream transmission opportunities over the coordinated group. The allocation of downstream and upstream transmission opportunities may be static (i.e., constant over time as set by the ME 128) or may be dynamic (e.g., variable over time, depending on traffic needs and within bounds set by the ME 128 and the PCE-O 123). The DRA 122 may receive Dynamic Resource Reports (DRRs) from the L2+ functionality module 112 for each of the lines in the coordinated group. Inside the NCE 120, the ME 128 may convey the management information (over an interface here called DRA-m) to the DRA 122.

The management information conveyed over the DRA-m interface imposes bounds on the allocation of upstream and downstream transmission opportunities per subscriber line within the coordinated group. The bounds imposed by the ME 128 on the DRA 122 may be related to configuration of upstream/downstream ratio, service level agreements (SLA), etc.

The PCE-O 123 may further impose bounds on the allocation of downstream and upstream transmission opportunities using information about traffic needs per line and environmental information within the DPU 110 related to power dissipation, e.g., temperatures and available power supplies. The necessary management information (e.g., temperature limits and power dissipation targets) may be conveyed over a PCE-m interface. Based on this information, the PCE 123 may track power consumption for all users and limits the allocation of transmission opportunities per subscriber line, in both upstream and downstream directions, accounting for various criteria including the traffic need and environmental information.

Figure 2:
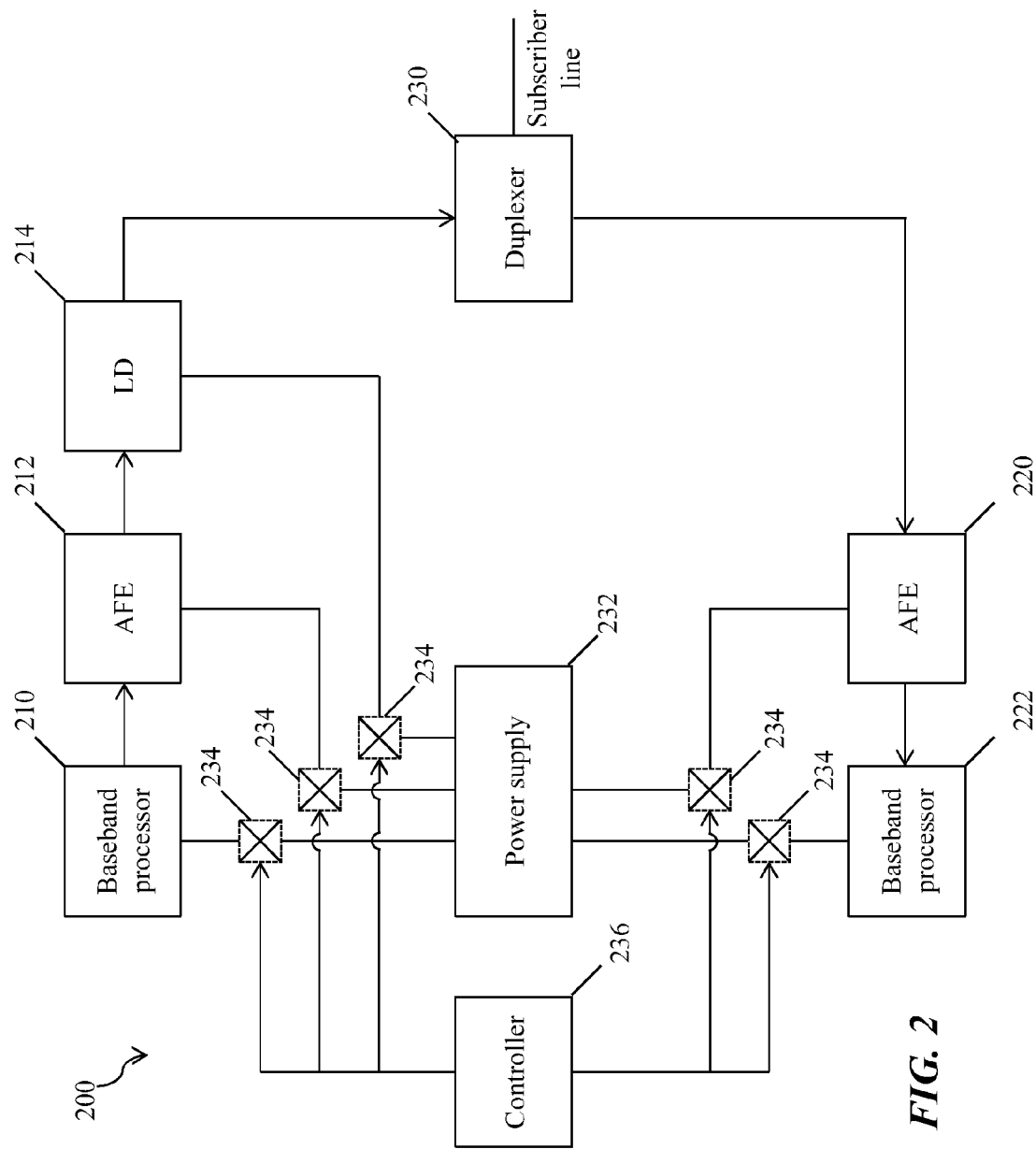
FIG. 2 is a schematic diagram of an embodiment of a DSL TU.

FIG. 2 illustrates an embodiment of a DSL transceiver unit (TU) 200, which may be included in the DPU 110, the CPE 130 or 140, an exchange, and/or a cabinet to implement data transmission and receiving. The transceiver 200 may comprise a transmitter section and a receiver section. The transmitter section may comprise a baseband processor 210, an analog front end (AFE) 212, and a line driver (LD) 214 arranged as shown in FIG. 2. The baseband processor 210 may be a digital signal processing (DSP) that processes data and generates digital signals, which may then feed into the AFE 212. The AFE 212 may comprise units such as a digital-to-analog (D/A) converter configured to convert the digital signals into analog signals. The LD 214 may comprise units such as a power amplifier configured to amplify the analog signals. An analog signal from the LD 214 comprising a superframe may further go through a duplexer 230 and then get transmitted to a subscriber line.

On the other hand, the receiver section may comprise an AFE 220 and a baseband processor 222 arranged as shown in FIG. 2. An analog signal comprising a superframe may be received by the duplexer 230 from a subscriber line. The AFE 220 may comprise units such as an analog-to-digital (A/D) converter configured to convert the analog signal into a digital signal. The digital signal may then be further processed by the baseband processor 222, which may be a DSP.

Components in the transmitter and receiver sections may further comprise a power supply 232 coupled to other components via switches 234, and a controller 236 configured to control the on/off status of some or all of the switches 234. In an embodiment of a discontinuous transmission mode, the controller 236 may be configured to turn off the baseband processor 210, the AFE 212, the LD 214, or any combination thereof, during inactive periods of a superframe. Turning off a component may be realized by opening a switch, and turning on a component may be realized by closing the switch. In an embodiment of a discontinuous receiving mode, the controller 236 may be configured to turn off the AFE 220, the baseband processor 222, or both, during inactive periods of a superframe. Note that during inactive symbols, a modulator input in a DPU may be set to zero.

It should be noted that FIG. 2 may include only part of all components in a transceiver, thus other components, such as a modulator, demodulator, noise canceller, etc., may also be included separately, if they are not included in as functions of the baseband processor. In addition, arrangement of certain components may vary. For example, there may be a common baseband processor for the transmitter and receiver sections, in which case the baseband processor 210 and the baseband processor 220 may be the same. There may be a common switch controlling more than one component, in which case these components may be turned on/off together.

In DSL communication systems, an xTU-O and its corresponding xTU-R may operate in a plurality of power management states or modes to maximize power savings. For example, three power management states are designed in G.992.3/G.992.5. The three power management states comprise a mode 0 (L0) state for normal operation mode, a mode 2 (L2) state for low power mode, and a mode 3 (L3) state for idle mode. The transceivers can reduce power consumption by reducing the transmit power in mode 2 (namely L2).

Figure 3:
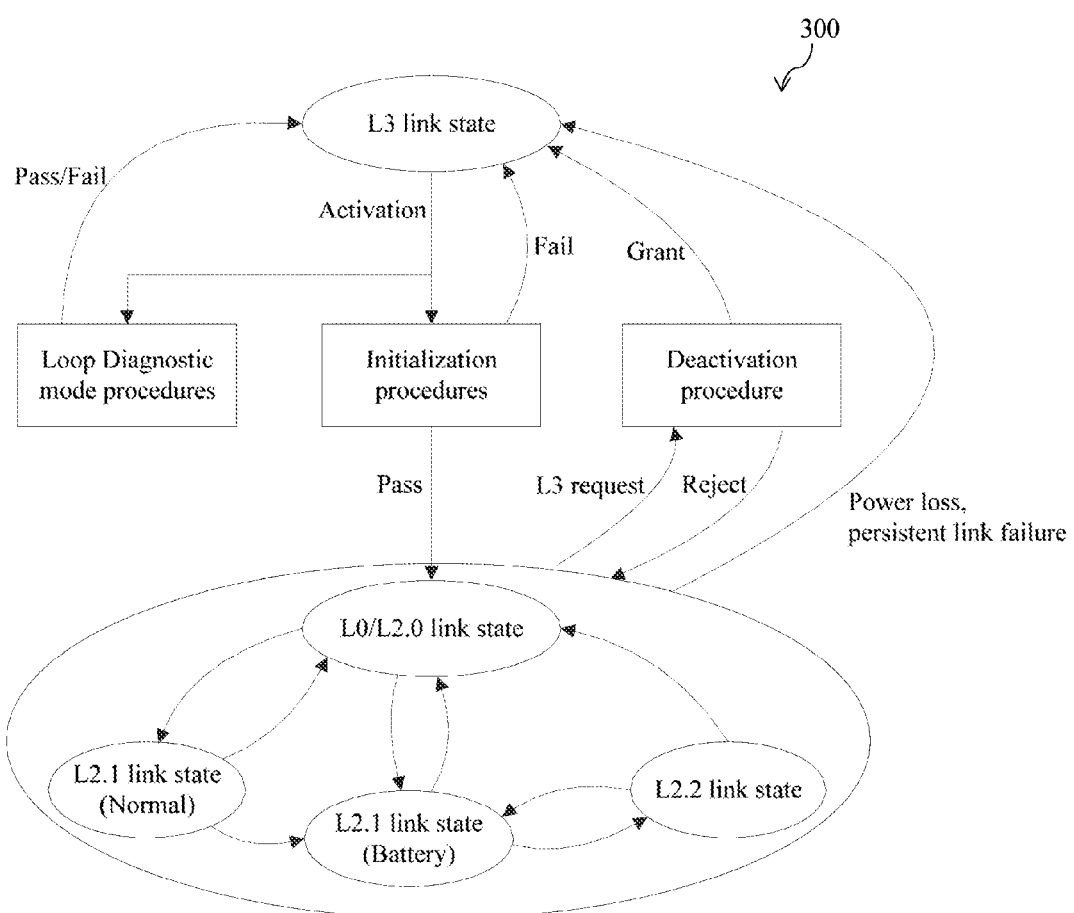
FIG. 3 is a schematic diagram of an embodiment of a link state transition diagram that has been adopted by the G.fast standard.

FIG. 3 illustrates an embodiment of a link state transition diagram 300 that has been adopted by the G.fast standard. The link state transition diagram 300 comprises a plurality of link states denoted as L0/L2.0, L2.1 (normal/battery), L2.2, and L3, as well as procedures that allow transition from one link state to another. The link states are shown in rounded boxes, whilst the procedures are shown as rectangular boxes. Link state L3 is an idle state in which both the FTU-O and its corresponding FTU-R may not transmit any signal. The link state may further includes sub-states denoted as L3.1 and L3.2. Specifically, L3.1 may be a powered idle state in which a subscriber line is powered but there is no signal on the line, while L3.2 may be an unpowered idle state in which the line is not powered and there is no signal on the line.

Link state L0 is a full power state that may be used during normal operation. The L0 mode allows for bit rates over subscribers lines to reach up to maximum values determined by a specified US/(US+DS) ratio. When the lines operate at their maximum bit rates, the power consumption and dissipation reach their maximum level. Note that even in the full power state, discontinuous operation may be efficiently used in L0 to reduce power consumption. For example, there is no need to transmit symbols if no data is available.

Link state L2.0 is a reduced power state or a power saving state, which may facilitate power reduction by controlling over the maximum transmission time during a TDD frame. A PCE (e.g., the PCE-O 123) may determine and update from time to time a maximum allowed transmission time for each line using corresponding control parameters. This allows an ME (e.g., the ME 128) to control an actual power dissipation of a DPU (e.g., the DPU 110), keeping the transmission time under a desired limit. The transmission time limit may vary from line to line and in some lines may reach a demarcation point between upstream and downstream. Discontinuous operation disclosed herein may be efficiently used in this state to further reduce power consumption.

Link state L2.1 is a low power state, which may allow substantial reduction in power consumption at the expense of reduced quality of service (QoS) (increased latency and significantly reduced maximum data rate). The state L2.1 may further comprise two sub-states denoted as L2.1 with mains powering (L2.1-Normal), and L2.1 with battery powering (L2.1-Battery). The two L2.1 sub-states may have substantially similar transceiver behavior, except for different transition times to other states (L0/L2.0 or L2.2 or between sub-states).

Link state L2.2 is a standby low power state. This state may be used for keep-alive applications during multi-hour battery backup, and may implement significant power reduction by substantially limiting allowed transmission time within a superframe and allowing increased latency up to 1 second for keep alive applications.

To save more power in different conditions (e.g., based on a data rate and/or power) more than one power saving state may be employed. If there are multiple power saving states, a total unused time of the time available for data transmission may be different in specific periods (such as in a TDD frame or a superframe) among these power saving states. In other words, a total number of DMT symbol positions during which no data is transmitted may be different in different periods. Comparatively speaking, a power saving state in which fewer DMTs are not transmitted may be called an L2.0 mode, and the power saving state in which more DMTs are not transmitted may be called an L2.1 mode.

As shown in FIG. 3, once a successful initialization procedure completes, a subscriber line may transition to link state L0 or L2.0 (L0/L2.0). Transition to link state L3 may be requested in L0, L2.0, L2.1, and L2.2 states (request for orderly leave). If a link state transition request is granted, the subscriber line may transition to L3 state by using a deactivation procedure. Otherwise, the subscriber line stays in the link state from which the L3 request was issued. If power loss or persistent link failure is detected, the subscriber line in L0, L2.0, L2.1 and L2.2 states may transition to L3 state.

It should be understood that regardless of specific notations of link states, the link state transition mechanisms disclosed herein may apply to any link state or sub-state.

Further, note that a power management state may refer to any of the link states or sub-states disclosed herein. Thus, as a TU transitions from one power management state to another, the transition may occur between states or within one state. Moreover, link state transition disclosed herein may also encompass transition from one sub-state to another.

Disclosed embodiments may control transitions of a line among different power management states or within a power management state or sub-state. A trigger condition for transition between power management states may be according to any suitable condition, such as a line data rate, a status of power supply, and whether other lines in the same vector group are turned on or off. In an embodiment, a link state transition is triggered by an observation of line data rate. Referring back to FIG. 1, each FTU-O such as the FTU-O 114, taken as an example, may comprise a rate monitor 116. One implementation disclosed herein is that a state transition may be initiated by the rate monitor 116. The rate monitor 116 may be configured to monitor service traffic and record a peak value over a period of time. The peak service traffic in the period may be referred to as a payload rate denoted as "Rate_Payload". Note that the period may be any suitable length, such as 1 second, 10 seconds, 120 seconds, or any other duration.

In operation, the rate monitor 116 may get a full power rate from a STDD-orthogonal frequency-division multiplexing (OFDM) transceiver unit (TU). The full power rate may also be obtained by an access node or a DPU control entity. The full power rate, denoted as "Rate_Full", may indicate a line data rate at which an FTU transmits a signal in every available symbol position without an inactive period. The Rate_Full can be determined after the TU reach showtime and can be updated by On-Line Reconfiguration (OLR) duration the showtime. If the Rate_Full is greater than Rate_Payload in a period, the TU can switch some symbols off, that is, to be inactive in some symbol positions. Then the rate monitor 116 can initiate a state transition request, which may take any suitable form, and send the request to the NCE 120 for state transition.

Suppose, for example, that Rate_Full=1000 mega bits per second (Mpbs), and that the rate monitor 116 determines that the service traffic has a maximum rate of 200 Mbps in a period such as a switch duration (e.g. 120 seconds). The switch duration can be set by an operator using a management information base (MIB). In this case, the rate monitor 116 knows that a certain TU such as FTU-O 114 can meet the service requirement with about 20 percent (20%) of symbol positions active. Then, the rate monitor 116 may initiate a state transition request, with an active symbol position ratio parameter of about 20% and an index that identifies the corresponding TU (e.g., the index of FTU-O-1 114 is 1).

The rate monitor 116 can be located inside the FTU-O 114, or may be an independent module in the DPU 110. Similarly, the rate monitor 134 can be located inside the FTU-R 132, or may be an independent module in the CPE 130. The rate monitor 116 can monitor downstream traffic since it is located in DPU 110, and the rate monitor 134 can monitor upstream traffic since it is located in CPE 130.

A state transition request initiated by the rate monitor 116 may be sent to the NCE 120, which may sometimes be referred to as a DPU control entity (DPUCE). After receiving the request, the NCE 120 may determine an indicator for the FTU-O 114. The indicator, often referred to herein as an active symbol indicator (ASI) may indicate or specify in which symbol position(s) the FTU-O 114 should be active and in which symbol position(s) the FTU-O 114 should be inactive. In an embodiment, the FTU-O 114 switches or turns off data transmission in an inactive symbol position. Switching off transmission means that the FTU-O 114 can switch off at least part of its functionalities. For example, the FTU-O 114 may be instructed to turn off analog modules and/or digital modules. Such digital modules may include fast Fourier transform (FFT) units, inverse fast Fourier transform (IFFT) units, and framing modules in a DSP (e.g., baseband processor 210). Such analog modules may include an AFE (e.g., the AFE 212) and a line driver (e.g., the LD 214). If the ratio of active symbol positions in an ASI is equal to or greater than the ratio value in the request of the rate monitor 116, the service traffic requirement is considered met in power saving state.

The NCE 120 or a DPUCE may consider the capability of the VCE 126 when determining an ASI, because the ASI may be related to vectoring coefficients of the VCE. The vectoring coefficients include precoder coefficients and canceller coefficients. Assume, for example, that in a symbol position, an active subset of the FTU-O 114 is K={TU-k1, TU-k2, . . . , TU-km}. The NCE 120 or a DPUCE may send the determined ASI to the VCE 126 and the FTU-O 114. The VCE 126 may calculate precoder coefficients by a channel matrix of the m lines in the subset K. A type number of the subsets may equal a type number of ASI. The VCE 126 may prepare different coefficients if the subset K is different.

In an embodiment, the VCE 126 may use the following approach to adapt with the subset variation. Suppose that the VCE 126 supports storing C sets of coefficients, where C is a number which is equal to or greater than two. The VCE 126 may know the subset type before a link state transition, and update the coefficients according the subset. The VCE 126 may calculate the C sets of coefficients and store them in a memory before the link state transition. The VCE 126 may support C types of active line subset, so the VCE 126 supports C types of ASI. The NCE 120 may know the capability of the VCE 126. When the FTU-O 114 requests to enter or transition to a power saving state, the NCE 120 may determine a nearest ASI which is supported by the VCE 126.

Now suppose, for example, that there are 200 downstream symbol positions in a superframe, and that the VCE 126 supports three types of ASI denoted as ASI-1, ASI-2, and ASI-3. The ASI-1 has a ratio of 10%, so the first 20 symbol positions (200*10%=20) in a superframe may be set as active and the $21\sim200^{th}$ symbol positions may be set as inactive. Suppose the ASI-2 has a ratio of 50%, so the first 100 symbol positions in a superframe may be set as active and the last 100 symbol positions may be set as inactive. Further, suppose the ASI-3 has a ratio of about 100%, so all symbol positions in a superframe may be set as active. For the three types of ASI denoted as ASI-1, ASI-2, and ASI-3, the VCE 126 may have the first subset during the first 20 symbol positions, and have the second subset during the $21\sim100^{th}$ symbol positions and have the third subset during the $101\sim200^{th}$ symbol positions.

In an embodiment, after knowing the capability of the VCE 126, the NCE 120 may determine an ASI according to a transmission ratio indicated by a request from the rate monitor 116. In the example above, if the rate monitor 116 requests about 20% of symbol positions to be active, the NCE 120 may determine that a lowest ASI supported by the VCE 126 which is larger than about 20% is ASI-2 with a ratio of 50%. The NCE 120 may then send the ASI-2 to the VCE 126 and to the FTU-O 114. The VCE 126 may add the FTU-O 114 to subset1 and subset2, and remove the FTU-O 114 from subset3. The VCE 126 may then update its three sets of vectoring coefficients.

In an embodiment, suppose the VCE 126 have relatively strong capability of updating vectoring coefficients. In this case, the VCE 126 may not need to calculate and store the vectoring coefficients in advance; instead, the VCE 126 may update the vectoring coefficients substantially in real-time. For such a VCE, the NCE 120 may flexibly determine the ASI. For example, if the rate monitor 116 requests to transition to a power saving state with an about 20% ratio, the NCE 120 may respond with an about 20% ratio ASI. In this case, the NCE 120 no longer needs to use the nearest 50% ratio. The NCE 120 may also send the ASI to the VCE 126 and to the FTU-O 114. The VCE 126 may then decide which lines are in an active subset and update precoder coefficients of each symbol position substantially in real-time. Note that the NCE 120 may coordinate the ASI of multiple TUs to ensure that the ASI can be implemented by the VCE 126. The NCE 120 usually knows the capability of the VCE 126.

It should be understood that a state transition disclosed herein is not limited to entering a power saving mode, and instead, a state transition can also contain quitting a power saving mode, or changing rate within a power saving mode. Suppose that a current power saving mode has about 20% performance. If a line data rate of the FTU-O 114 is lower than about 5% of a full power rate continuously over a period, the rate monitor 116 can request to transit the FTU-O 114 to a lower L2.0 state. Otherwise, if a line data rate of the FTU-O 114 is higher than about 20% of the full power rate, the rate monitor 116 can request to transit the FTU-O 114 to a higher-power L2.0 state, or quit the L2.0 state and enter the L0 state. Note that state transitions may be controlled by the NCE 120 or a DPUCE.

The rate monitor 116 can monitor traffic at the DPU side, and the rate monitor 134 can monitor traffic at the CPE side. If a state transition is initiated by the rate monitor 134 at the CPE side, the state transition request may reach the DPU 110 by an embedded operation channel (EOC) channel of the FTU-O 114. The state transition request from the CPE side may also be reported to the NCE 120 or a DPUCE.

Figure 4:
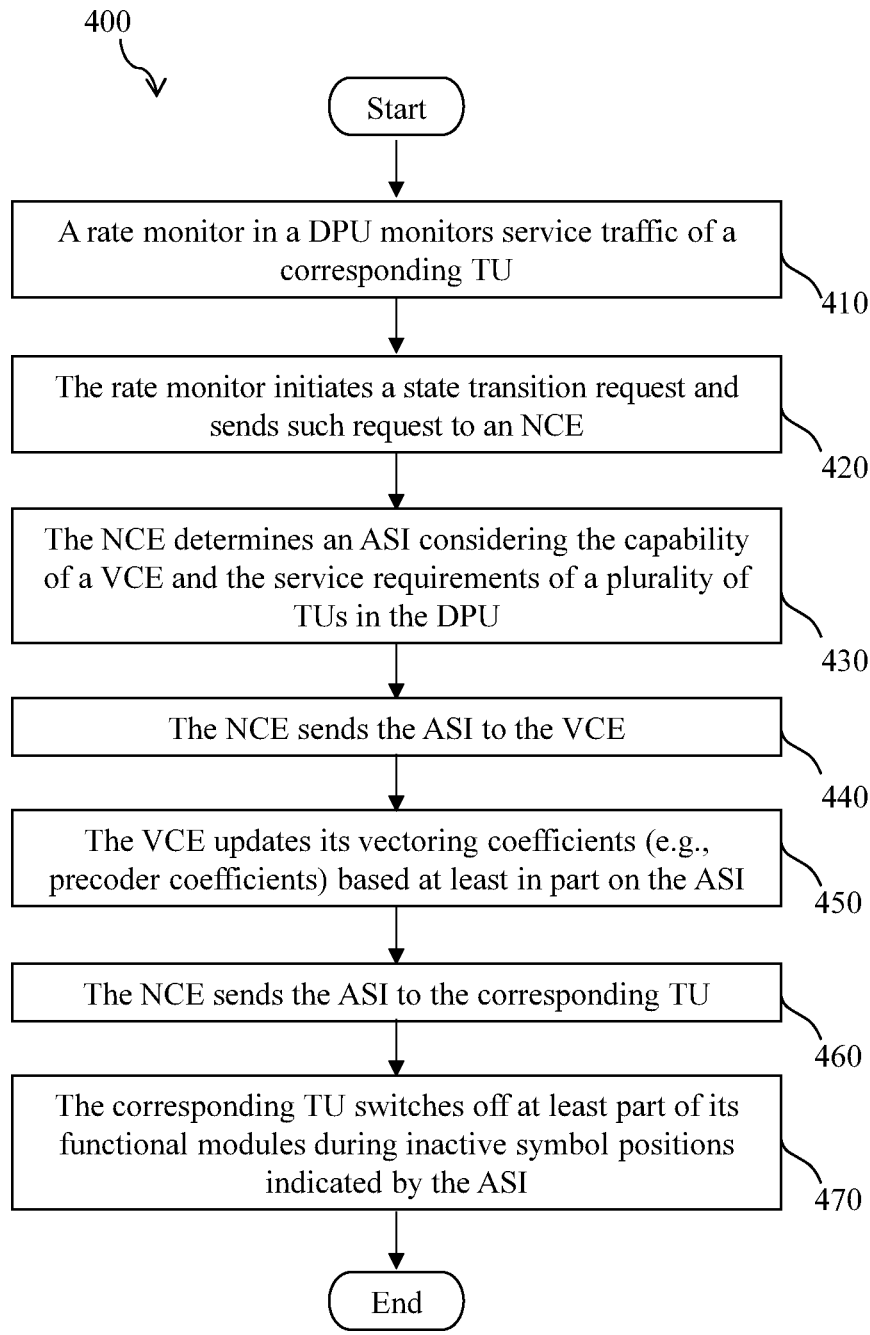
FIG. 4 is a flowchart of an embodiment of a power management method based on data traffic.

FIG. 4 illustrates an embodiment of a power management method 400 based on data traffic. In an embodiment, a DPU (e.g., the DPU 110) may implement the method 400. In step 410, a rate monitor (e.g., the rate monitor 116) may monitor service traffic of a corresponding TU (e.g., the FTU-O 114). In step 420, the rate monitor may initiate a state transition request, and send such request to an NCE (e.g., the NCE 120). In step 430, the NCE 120 may determine an ASI considering the capability of a VCE (e.g., the VCE 126) and the service requirements of a plurality of TUs (e.g., including FTU-O-1 to FTU-O-n) in the DPU 110. In step 440, the NCE 120 may send the ASI to the VCE 126. In step 450, the VCE 126 may update its vectoring coefficients (e.g., precoder coefficients) based at least in part on the ASI. In step 460, the NCE 120 may send the ASI to the corresponding TU (e.g., the FTU-O 114). In step 470, the corresponding TU may switch off at least part of its functional modules (e.g., signals or circuits) during the inactive symbol positions indicated by the ASI.

In an embodiment, a superframe comprises 256 data frames, numbered or indexed from 0 to 255, followed by a sync frame. The 256 data frames are modulated onto 256 data symbols, and the sync frame is modulated onto a sync symbol. The data frames may be transmitted consecutively without temporal gap between any two data frames. The sync frame may be used for synchronization between a DSL transmitter and receiver.

Figure 5A:
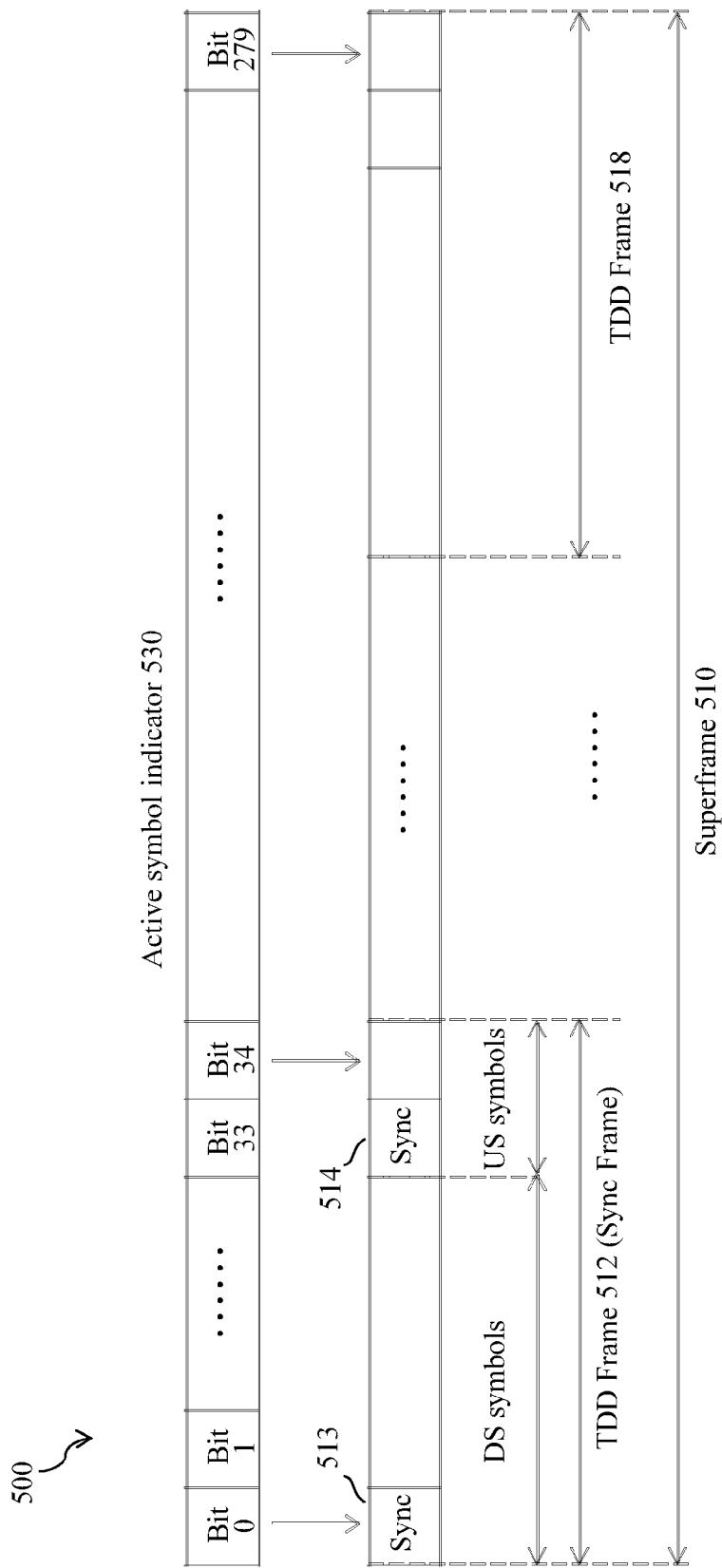
FIG. 5A is a schematic diagram of an embodiment of a symbol indicating scheme.

FIG. 5A illustrates an embodiment of a symbol indicating scheme 500. The data transmission units of an STDD-DMT communication system such as G.fast include DMT symbols, TDD frames, and superframes. For example, a superframe 510 as defined in G.fast comprises a plurality of TDD frames (e.g., TDD frames 512 and 518), wherein the number of frames may be flexible. Each TDD frame comprises a plurality of DMT symbols (e.g., the TDD frame 512 includes sync symbols 513 and 514), wherein the number of symbols may be flexible. A DMT symbol is the basic transmit unit of G.fast. The symbols may be STDD-DMT symbols or STDD-OFDM symbols depending on the design.

In an embodiment, the superframe 510 is made up by 8 TDD frames. Each TDD frame may contain 36 symbol positions, in which 35 symbol positions may be for data symbols and one symbol position may be for an upstream-downstream gap. The total symbol position number of upstream and downstream in a TDD frame may be 35. Thus, the superframe 510 may have a total of 280 data symbol positions. The ratio of upstream or downstream symbols may be flexible. An exemplary symbol rate is about 48 kilo-hertz (KHz), in which case a symbol length is 20.83 micro seconds. G.fast may use TDD as a way to separate the upstream and downstream transmission.

In the present disclosure, a symbol indicator may be used to specify a number of active symbols and a number of inactive symbols in a superframe in order to implement link state transitions. As shown in FIG. 5A, an ASI 530 comprises 280 bits, denoted as bit 0 to bit 279, corresponding to symbol numbers of the superframe 510.

Figure 5B:
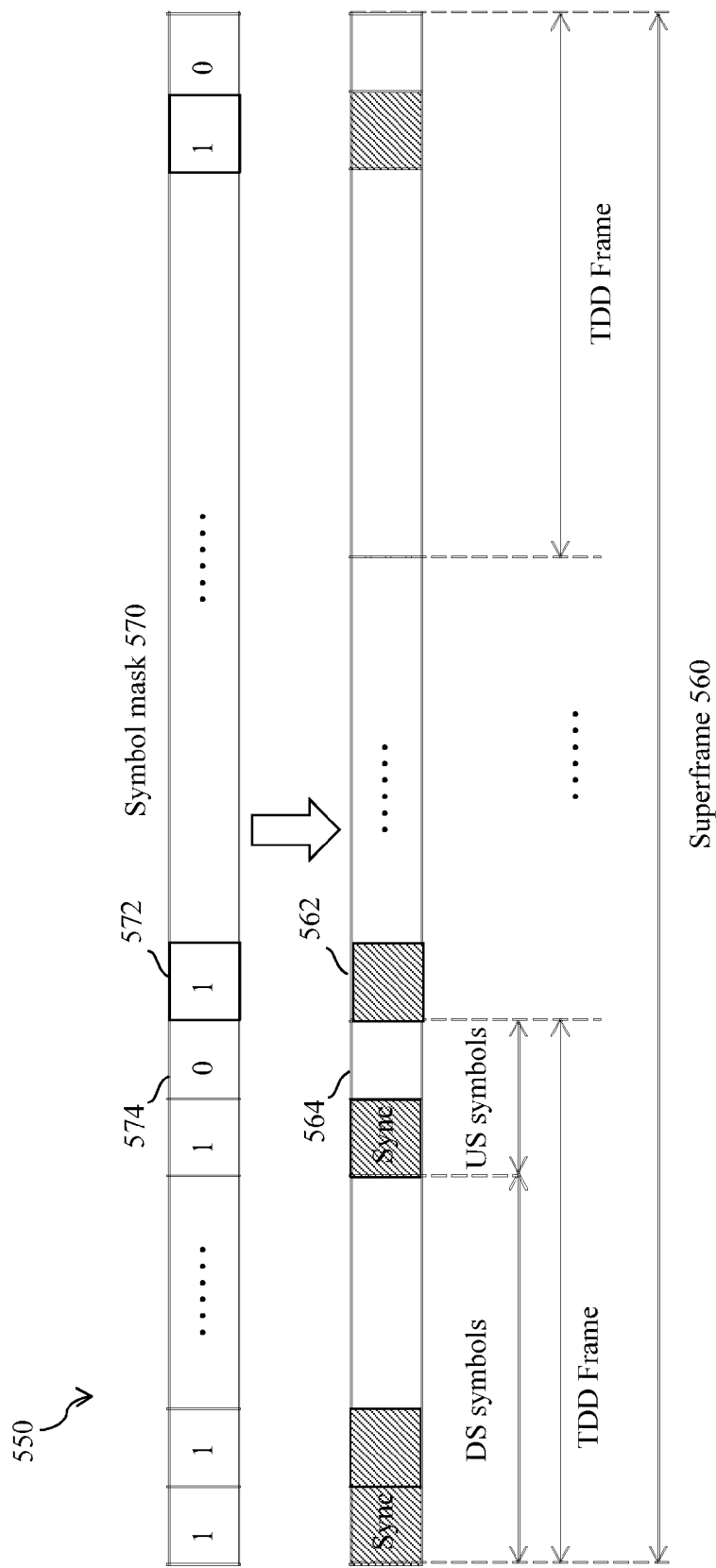
FIG. 5B is a schematic diagram of an embodiment of a symbol indicating scheme, which is an example of the scheme shown in FIG. 5A.

FIG. 5B illustrates an embodiment of a symbol indicating scheme 550, which uses a superframe 560 similar to superframe 510. A symbol mask 570, which contains 280 bits, is shown as a specific example of the ASI 530. The 280 bits of the symbol mask 570 indicate which data symbol positions are active and which data symbol positions are inactive in the superframe 560. Each bit in the symbol mask 570 corresponds with one data symbol position in the superframe 560.

In an embodiment, if a binary value of a bit in the symbol mask 570 is 1, it means that a TU is active in that symbol position. Otherwise if the value of the bit is 0, it means that the TU is inactive in that symbol position. Synchronization (sync) symbol positions may have a value of 1 to keep transmission on. Note that the symbol mask 570 could also be configured the other way, i.e., a value of 1 indicates an active symbol position and a value of 0 indicates an active symbol position.

The TU may switch off its data transmission for power saving during the inactive symbol positions. For example, as shown in FIG. 5B, since a symbol position 562 has a corresponding bit 572 with a value of 1, the symbol position 562 is active, and data transmission by the TU may remain on or be turned on at the symbol position 564. Similarly, since a symbol position 564 has a corresponding bit 574 with a value of 0, the symbol position 564 is inactive, and data transmission by the TU may remain off or be turned off at the symbol position 564.

There may be special usages for a symbol mask disclosed herein. For example, if all 280 bits of the symbol mask are all 1's, it means that the current state of a VCE does not support power saving, thus the TU may keep full power. For another example, if the 280 bits are all 0's, it means that the VCE supports switching to be inactive at any symbol position without influencing other lines in terms of crosstalk.

In an embodiment, an NCE or a VCE may find that crosstalk is relatively weak among a vectored group of subscriber lines, and that a switch-on or a switch-off of a given TU may not noticeably influence the stability of other TUs. In this case, the NCE or the VCE can apply an all-zero symbol mask to the TU, in which all bits have the value of 0.

According to an embodiment, in a DPU coupled to a vectored group of subscriber lines and comprising a plurality of TUs including a first TU and at least one next TU, a processor may determine a link state in which data transmission is disabled for the duration of one or more symbols in a superframe, instruct the first TU to operate in the determined link state, and coordinate data transmission by the at least one next TU to avoid an increase of crosstalk from the first line to the at least one next subscriber line due to the first TU operating in the determined link state.

Figure 6:
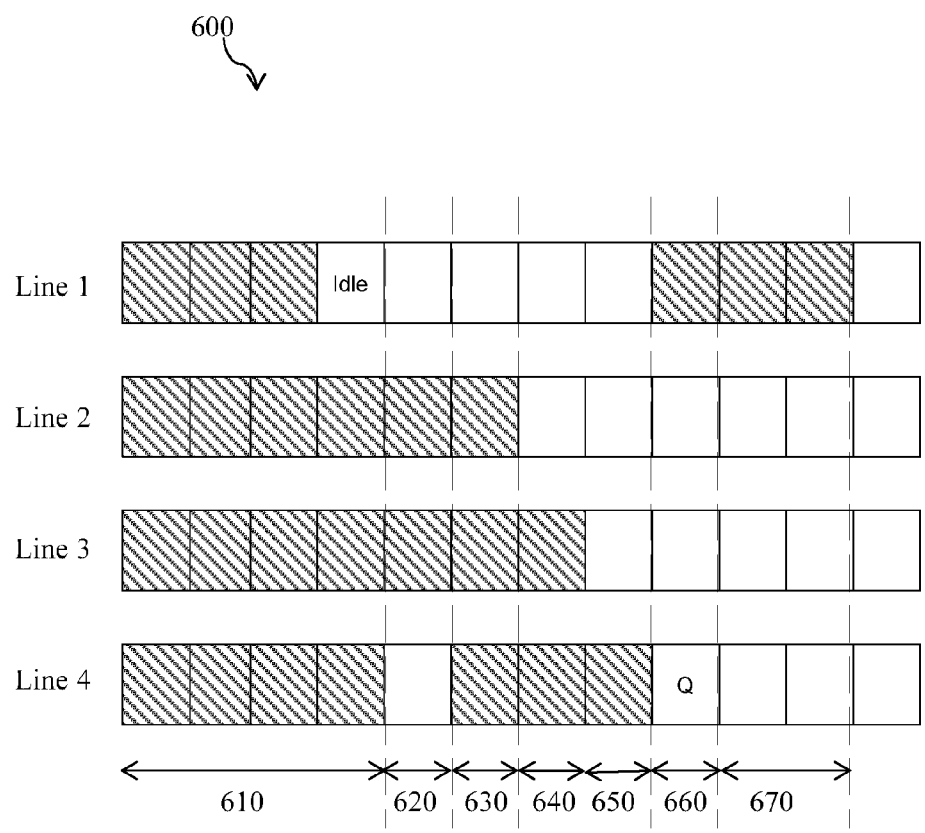
FIG. 6 is a schematic diagram of an embodiment of a coordinated power management scheme applied on a plurality of subscriber lines.

FIG. 6 illustrates an embodiment of a coordinated power management scheme 600 applied on a plurality of subscriber lines, denoted as Lines 1-4 as an example. Recall that, to facilitate transceiver power savings during periods of normal data transmission, discontinuous operation may be enabled, where not all of the time available for data transmission is used such that power savings proportional to the amount of transmit data may be achieved. The scheme 600 shows symbol positions or symbol periods in one or more TDD frames of a superframe (e.g., the superframe 510 or 560). Symbol positions are divided based on time into several periods or intervals 610-670, the length of each depends on a number of symbols included in the period. For instance, the period 610 comprises four symbol positions, while the periods 620-660 each comprise one symbol position.

The period 610 represents a normal operation interval, and a combination of the periods 620-670 represent a discontinuous operation interval. An ASI disclosed herein may indicate numbers and positions of active and inactive symbols during a normal operation interval and a discontinuous operation interval. Note that during inactive symbols, a modulator input in a DPU may be set to zero. The ASI may be implemented using various ways, such as the symbol mask described supra. As another example of ASI, the normal operation interval may be defined by a number of symbol periods, and the number is sometimes referred to as TTR. The period 610 may start from a robust management channel (RMC) symbol and has a duration of TTR symbols. The value of TTR may be different from one logical frame to another. If a particular line does not have data to send during the normal operation interval, it sends one or more idle symbols or data symbols filled with dummy data units (DTUs). As shown in FIG. 6, Line 1 does not have data to send during the last symbol position of the period 610, a TU coupled to Line 1 may then send an idle symbol (it may send a quiet symbol instead).

In an embodiment, an ASI may be represented by a transmission budget (TBUDGET), a TTR, and a TA. The TBUDGET represents a total number of allocated symbols in the combined normal and discontinuous operation intervals; the notation TTR represents the number of symbols in the normal operation interval; and the notation TA represents a number of quiet symbols inserted at the beginning of the discontinuous operation.

The discontinuous operation interval represented by a combination of the periods 620-670 may be configured with controlled positioning of data, idle, and quiet symbols. Power savings may be achieved in the discontinuous operation interval by transmission of quiet symbols in symbol periods where there is no end user data. Further power savings may be achieved by appropriately aligning the data symbols in each of the lines in the vectored group so as to reduce the size of crosstalk cancellation matrices by using one or more M×M matrices instead of the one full N×N matrix where N represents a total number of lines, while M represents a number of active lines (M<N). Note that for each line, there may be a plurality of matrices of the same size, each for a subcarrier. The configuration of the symbol periods across the lines in the vectored group may be centrally controlled thorough a DRA module (e.g., the DRA 122).

In deployment scenarios where there is little or no expected crosstalk, such as in a single subscriber line or a DPU deployed to drop wires with no common cable sheath, a vectoring function (e.g., controlled by a VCE) may be disabled. When vectoring is disabled, the transmitter system may send data symbols during normal operation interval, and then send quiet or idle symbols during a discontinuous operation interval.

When vectoring is enabled among multiple subscriber lines such as Lines 1-4 with discontinuous operation, both FTU-Os and corresponding FTU-Rs may support a separate baseline bit-loading table for each of the intervals (a bit-loading table for normal operation interval and a bit-loading table for the discontinuous operation interval). Similar to bit loading, in the downstream direction at least, the normal interval and discontinuous interval may have different set of gains assigned.

As shown in FIG. 6, in the period 610, a transmission system may be operating with full 4×4 crosstalk cancellation. In the period 620, Line 2 and Line 3 transmit while Line 1 and Line 4 do not transmit, thus ASIs for all lines may be configured to indicate such transmission scheme. Further, since Line 1 and Line 4 do not transmit in the period 620, crosstalk induced onto Line 1 and line 4 may be disregarded for the period 620. In an embodiment of coordinated power management, vectoring coefficients may be updated to reduce the size of vectoring matrices. Vector processing may be simplified where the matrix sizes are smaller, thereby achieving some power savings with fewer operations in matrix multiplications.

As shown in FIG. 6, in the period 630, crosstalk cancellation may be size 3×3 applied to Lines 2, 3, and 4. In the period 640, crosstalk cancellation may be size 2×2 that is applied to Lines 3 and 4. In the period 650, only Line 4 has active symbol, thus the vectoring function may be disabled or turned off. In the period 660, vectoring function may be disabled or 2×2 crosstalk cancellation may be applied on Lines 1 and 4. Finally, in the period 670, only Line 1 has active symbols, thus the vectoring function may be turned off.

The coordinated power management scheme 600 shows that when traffic patterns allow, it is possible that the vector processing may be turned off in the discontinuous operation region, e.g., when data symbols are distributed across the available symbol periods so as to avoid any common slots with the other lines in the vector group. During the time, such as in the periods 650 and 670, when only one line is active, crosstalk cancellation processing may be turned off. Power saving in the DPU may result from the quite symbols distributed across the lines and some power savings in the crosstalk cancellation processing with the reduced matrix sizes.

An ASI may be determined by a DRA or a VCE based on the data traffic and may indicate the number of symbols in the normal operation interval. In the discontinuous interval, different alignments of data symbols, quite symbols, and idle symbols can be used to reduce power consumption and improve performance, as shown in FIG. 6. During the interval of discontinuous operation, a precoder matrix comprising precoder coefficients for a subcarrier may be adjusted to a number of lines in a vector group containing data symbols. Other adjustments may also be made to coordinate power managements, such as adjustments on each line of the transmit power spectrum density (PSD), active bit load table, and frequency-domain equalizer (FEQ). If there is no data to send during a symbol period in the discontinuous operation interval, it is at the discretion of the DPU on whether to send an idle symbol or a quiet (Q) symbol.

When operating with vectoring, the configuration of the symbol periods across the plurality of subscriber lines (i.e., the vector group) in a DPU should be configured in a manner that achieves a balance between performance and power savings. Transceiver power saving may be achieved through the use of quite symbols when no data is present and in the alignment of data symbols among the lines in the vector group to reduce the sizes of cancellation matrices.

The present disclosure teaches synchronization between coefficient updates and link state transitions. In an embodiment, updating vectoring coefficients in a VCE and link state transition in a TU may be synchronized, which means that a coefficient update and a TU state transition happen at about the same time. For example, since G.fast has a counter for superframe, and the counter may count from 0 to 1023, an NCE may respond to a state transition request with a transition time instant. The NCE may use the superframe counter to indicate the time instant to switch to another link state or sub-state. For example, the NCE sends a reply to the VCE and TU with a switch counter of 300. The VCE may update the cancellation coefficients from the superframe with counter 300, and the TU may transit to a different power saving state in the superframe with counter 300.

Recall that there may be scenarios that do not require synchronization (e.g. no crosstalk or very little crosstalk among a vectored group of lines). In these scenarios, the NCE can use a flexible way to notify the switch time. For example, the NCE can notify the TU that it can switch any time after receiving a reply message.

Note that when a link state transition occurs, parameters employed by a TU may need to be reconfigured. For example, the TU physical layer parameters may need reconfiguration because crosstalk changes between link states 10 and 12. Exemplary physical layer parameters contain, but are not limited to, bit allocation, gain allocation, transmit spectrum shaping, actual data rate, actual size of forward error-correcting codeword, actual number of forward error-correcting code redundancy bytes, and actual number of bits per symbol. In an embodiment, a TU may update its parameters through an OLR mechanism. The TU can modify the parameters prior to or at the same time with state transition by exchanging information with an NCE. For example, the NCE may notify the TU to perform an OLR according the L2 state. The TU may reply to the NCE after finishing the OLR. Then, the NCE may determine a switch time point for transitioning to the L2 state and send the time point to a VCE and the TU.

Referring back to FIG. 1, recall that transition between power management states (e.g., link states) may be triggered by power status and initiated by a PCE (e.g., the PCE-O 123). A DPU (e.g., the DPU 110) in G.fast may use remote power supply technology, thus the DPU 110 may not connect to an alternating current (AC) power source. Instead, the DPU 110 may obtain power from a CPE (e.g., the CPE 130) via subscriber lines such as twist pairs. Further, the DPU 110 may have a battery to store power to operate when no CPEs are connected or in an emergency situation. The PCE-O 123 can monitor the state of power or battery. In an embodiment, if the power of the DPU 110 or the CPE 130 is not enough, a TU may enter a deep power saving state or a sleep mode, in which at least part of the TU is turned off.

Figure 7:
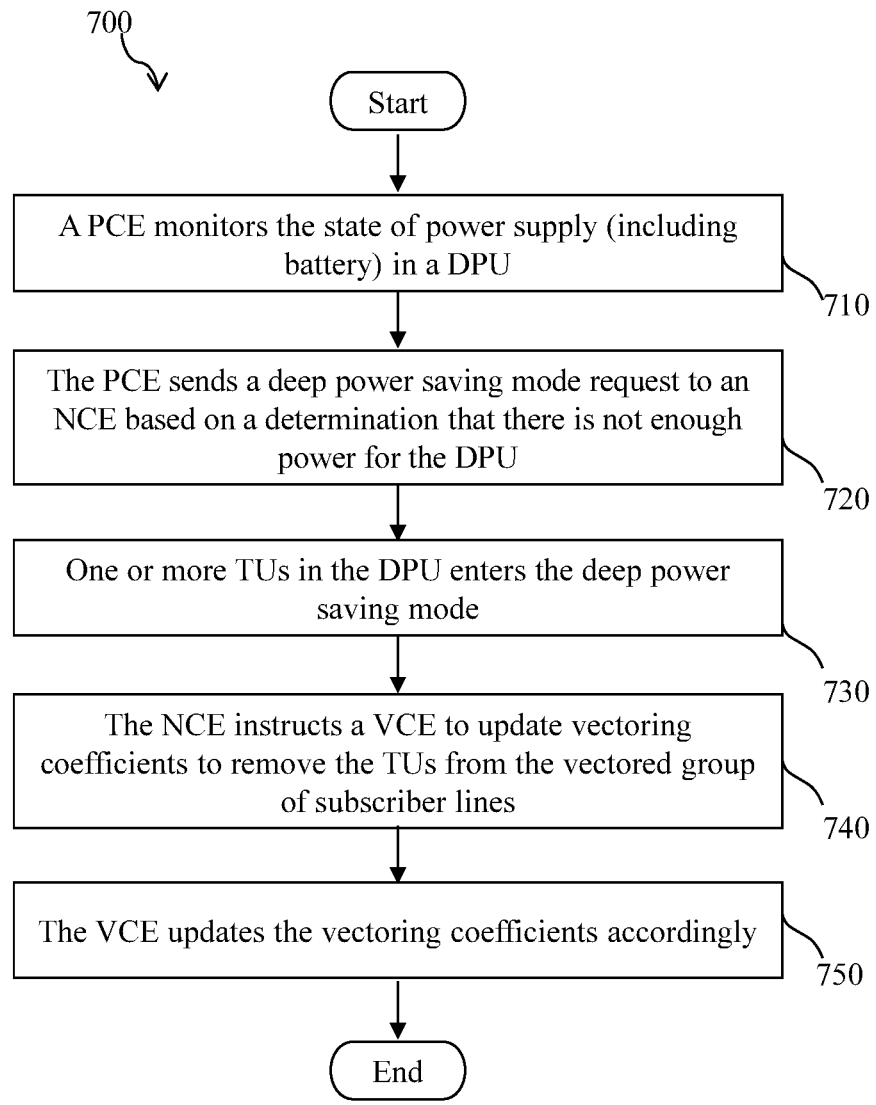
FIG. 7 is a flowchart of an embodiment of a state transition method to enter a deep power saving state.

FIG. 7 illustrates an embodiment of a state transition method 700 initiated by a PCE (e.g., the PCE-O 123) and based on power status. In an embodiment, a DPU (e.g., the DPU 110) or a CPE may implement the method 700 to enter a deep power saving mode. Note that a PCE may reside inside a TU or outside the TU. A PCE-O in DPU can monitor the power state at DPU side, and a PCE-R in a CPE can monitor the power state at a customer premises side.

In step 710, the PCE may monitor the state of power supply (including battery) of the DPU. In step 720, the PCE may send a deep power saving mode request to an NCE (e.g., the NCE 120) based on a determination that there is not enough power for the DPU. In step 730, one or more TUs (e.g., the FTU-O 114) in the DPU may enter the deep power saving mode. In step 740, the NCE 120 may notify or instruct a VCE (e.g., the VCE 126) to update the vectoring coefficients to remove the FTU-O 114 from the vectored group of subscriber lines. In step 750, the VCE 126 may update its vectoring coefficients (e.g., precoder coefficients) accordingly. Note that in the step 730, the one or more TUs may switch states after getting a reply from the NCE 120, or switch immediately after receiving such a request. In some situations, e.g., with critical power shortages, a TU may be required to sleep at once without any delay.

Figure 8:
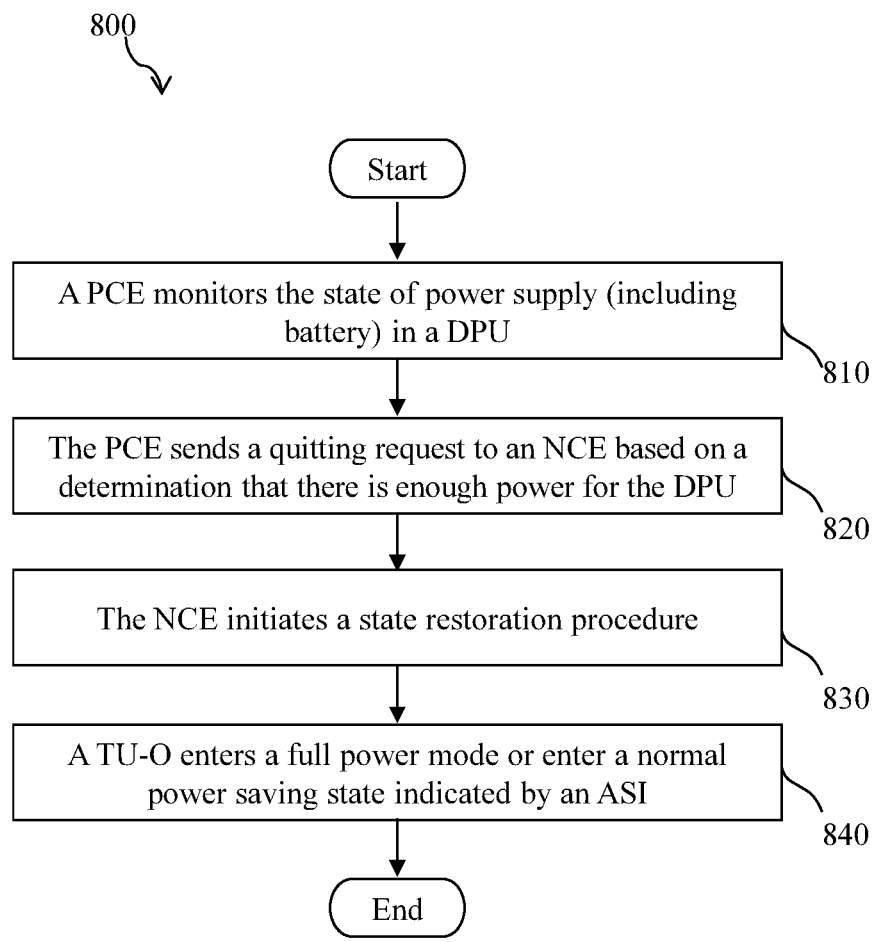
FIG. 8 is a flowchart of an embodiment of a state transition method to exit a deep power saving state.

FIG. 8 illustrates an embodiment of a state transition method 800 to exit a deep power saving state. In an embodiment, a DPU (e.g., the DPU 110) may implement the method 800. In step 810, the PCE may monitor the state of power supply (including battery) of the DPU. In step 820, the PCE may send an exit or quitting request to an NCE (e.g., the NCE 120) based on a determination that there is enough power for the DPU (e.g., power has resumed). In step 830, the NCE 120 may initiate a state restoration procedure. In an embodiment of the procedure, a corresponding TU-R may recover its clocks, and both the TU-O and TU-R may update their physical layer parameters. Further, a VCE (e.g., the VCE 126) may add the TU-O to the vector group of lines and update the coefficients. After the restoration procedure, in step 840 the TU-O may enter a full power mode or enter a normal power saving state indicated by an ASI.

Referring back to FIG. 1, recall that transition between power management states (e.g., link states) may be initiated by an NCE (e.g., the NCE 120) to optimize an ASI. That is, the NCE 120 may optimize TDD symbol position assignment to improve power saving by monitoring a plurality of TUs in the DPU 110.

In an embodiment, the NCE may monitor conditions including activation, deactivation, and power saving state transitions. For example, if the sum of service traffic ratio requirement of all showtime lines is less than about 100% of the nominal capacity of a single line, it means that all TUs can use a full time-division multiple access (TDMA) way to transmit signals. In this situation, the NCE 120 can assign a special symbol mask group to satisfy the condition that there is no more than one TU transmit signal in any given symbol position. For example, the FTU-O 114 may transmit during a first symbol position but not a second symbol position, while the FTU-O 118 may transmit during the second symbol position but not the first symbol position. As described supra with respect to FIG. 6, when a TU is active, the other TUs are inactive so there may be no need for crosstalk cancellation. Thus, the NCE 120 can notify the VCE 126 to switch cancellation off to get more efficient power saving.

In an embodiment, the NCE 120 can reserve some empty symbol positions for initialization of one or more new lines. When a TU performs initialization, the TU may need some clean symbol positions without any crosstalk to get a rapid and accurate training. In this situation, the NCE 120 can initiate a state transition to force showtime TUs to reserve some symbol positions in which the showtime TU are inactive to leave them for initializing the new line coupled to the TU.

Figure 9:
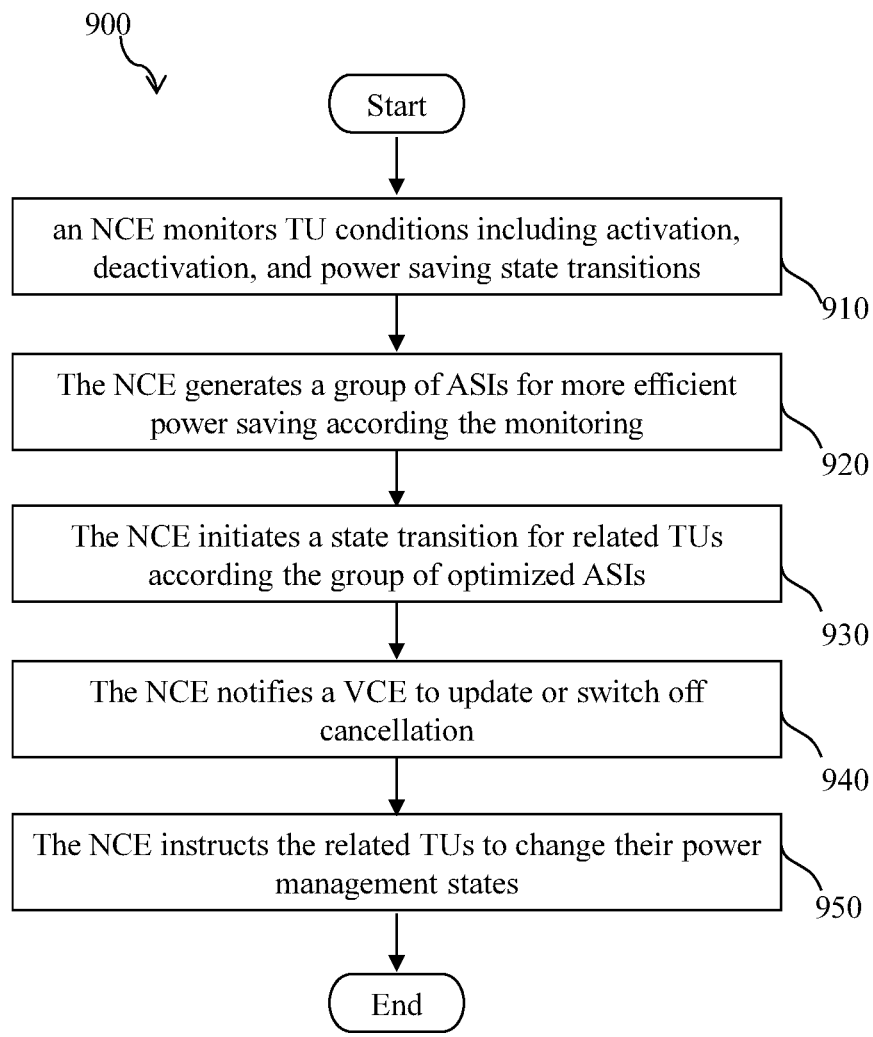
FIG. 9 is a flowchart of an embodiment of a power management method.

FIG. 9 illustrates an embodiment of a power management method 900. In an embodiment, a DPU (e.g., the DPU 110) may implement the method 900. In step 910, an NCE (e.g., the NCE 120) monitors conditions of a plurality of TUs, wherein conditions include activation, deactivation, and power saving state transitions. In step 920, the NCE 120 may generate a set or a group of ASIs for more efficient power saving according to the monitoring. In step 930, the NCE 120 may initiate a state transition for related TUs according the group of optimized ASIs. In step 940, the NCE 120 may notify a VCE (e.g., the VCE 126) to update or switch off cancellation. In step 950, the NCE 120 may instruct the related TUs to change their power management states.

Figure 10:
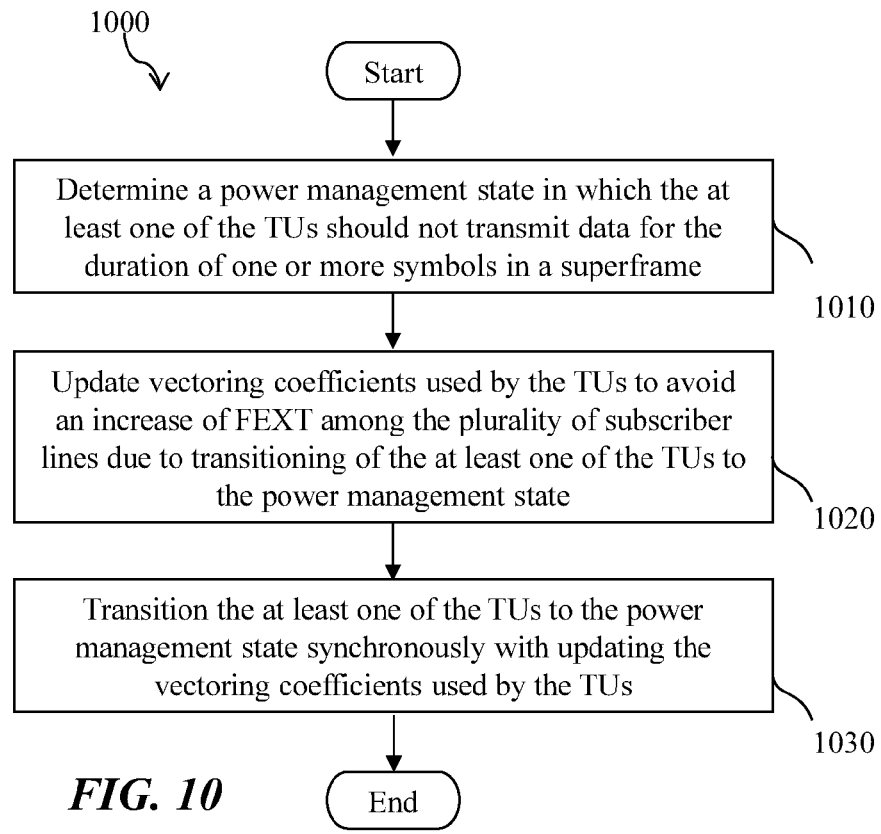
FIG. 10 is a flowchart of another embodiment of a power management method.

FIG. 10 illustrates an embodiment of a power management method 1000. In an embodiment, the method 1000 may be implemented by a network device (e.g., the DPU 110) comprising a plurality of TDD TUs for coupling to a plurality of subscriber lines. In step 1010, the network device may determine a power management state in which the at least one of the TUs should not transmit data for the duration of one or more symbols in a superframe. In step 1020, the network device may update vectoring coefficients used by the TUs to avoid an increase of FEXT among the plurality of subscriber lines due to transitioning of the at least one of the TUs to the power management state.

Note that other techniques such as updating TU parameters (e.g., Physical Media Dependent (PMD) sub-layer parameters) may also avoid increase of FEXT, thus any suitable technique may be used. Further, even if updating the vectoring decreases or establishes FEXT, it is possible that the FEXT may increase due to other reasons, e.g., sudden change of subscriber line conditions. In such case, the goal of updating vectoring coefficients to avoid an increase of FEXT due to state transitioning is still considered achieved. In an embodiment, the vectoring coefficients comprises at least precoder coefficients. In step 1030, the network device may transition the at least one of the TUs to the power management state synchronously with updating the vectoring coefficients used by the TUs.

Figure 11:
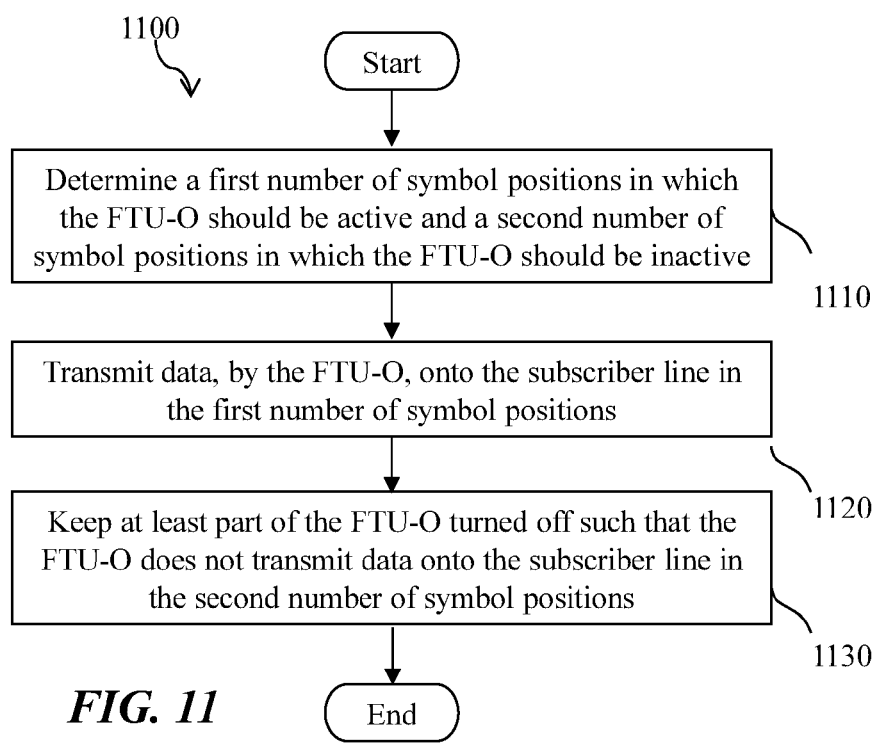
FIG. 11 is a flowchart of yet another embodiment of a power management method.

FIG. 11 illustrates an embodiment of a power management method 1100. In an embodiment, a DPP (e.g., the DPU 110) may implement the method 1100. In step 1110, the DPU may determine a first number of symbol positions in which the FTU-O should be active and a second number of symbol positions in which the FTU-O should be inactive, wherein the first number of symbol positions and the second number of symbol positions belong to one or more TDD frames of a superframe. In step 1120, the DPU may transmit data, by the FTU-O, onto the subscriber line in the first number of symbol positions. In step 1130, the DPU may keep at least part of the FTU-O (e.g., at least an AFE and a line driver) turned off such that the FTU-O does not transmit data onto the subscriber line in the second number of symbol positions.

Figure 12:
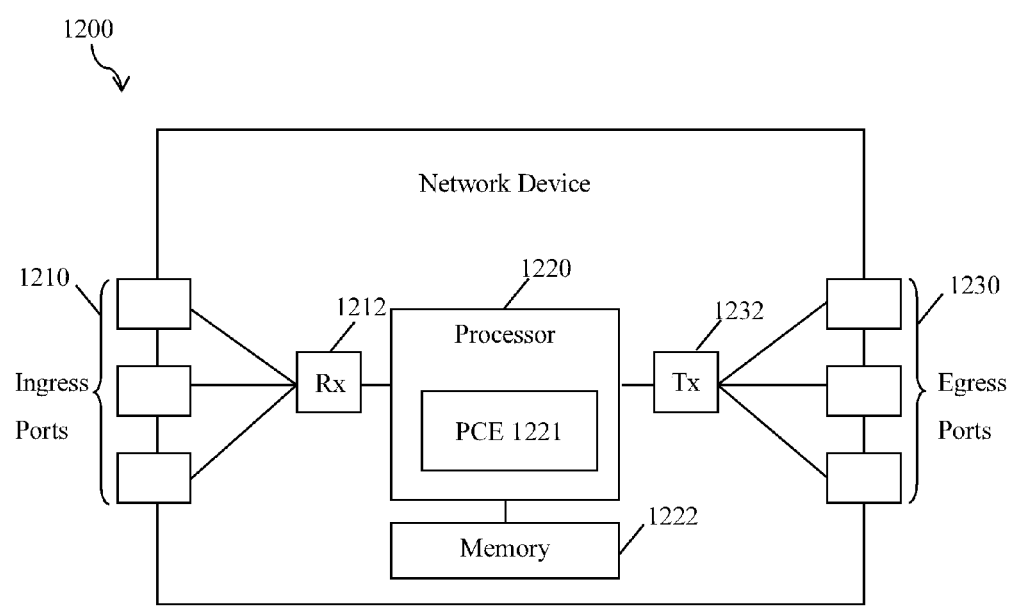
FIG. 12 is a schematic diagram of an embodiment of a network device.

FIG. 12 illustrates an embodiment of a computer system or network device 1200. The network device 1200 may be implemented as any suitable device disclosed herein, such as a DPU (e.g., the DPU 110) or a CPE (e.g., the CPE 130 or 140). The network device 1200 should be capable of receiving, processing, and transmitting messages such as user data packed in data symbols, TDD frames, and superframes, and state transition requests to and from a network such as a DSL system. The network device 1200 may comprise one or more ingress ports 1210 coupled to a receiver (Rx) 1212, which may be configured for receiving data from other network components. The network device 1200 may further comprise one or more egress ports 1230 coupled to a transmitter (Tx) 1232, which may be configured for transmitting data to other network components. The network device 1200 may further comprise a logic unit or processor 1220 coupled to the receiver 1212 and configured to process data or otherwise determine to which network components to send the data.

The processor 1220 may be implemented using hardware or a combination of hardware and software. The processor 1220 may be implemented as one or more central processor unit (CPU) chips, cores (e.g., a multi-core processor), field-programmable gate arrays (FPGAs), application specific integrated circuits (ASICs), and/or digital signal processors (DSPs). The processor 1220 may be configured to implement any of the functional modules or units described herein, such as the NCE 120 (or any/all components therein), the rate monitor 116, the rate monitor 134, the PCE-R 138, the controller 236, the baseband processors 210 and 222, or any other functional component known by one of ordinary skill in the art, or any combinations thereof. For instance, the processor 1220 may implement a PCE module 1221, which may be used to determine a power status for the network device 1200. The network device 1200 may further comprise at least one memory 1222. The memory 1222 may be configured to store any data or information such as user data or crosstalk cancellation coefficients.

In practice, there may be bidirectional traffic processed by the network device 1200, thus some ports may both receive and transmit data symbols. In this sense, the ingress ports 1210 and egress ports 1230 may be co-located or may be considered different functionalities of the same ports that are coupled to transceivers (Rx/Tx). One of more of the processor 1220, the memory 1222, the receiver 1212, and the transmitter 1232 may also be configured to at least partially implement or support any of the methods and implementations described above, such as the power management method 400, the symbol indicating schemes 500 and 550, the coordinated power management scheme 600, the state transition methods 700 and 800, and the power management methods 900, 1000, and 1100.

It is understood that, by programming and/or loading executable instructions onto the network device 1200, at least one of the processor 1220 and the memory 1222 can be changed. As a result, the network device 1200 may be transformed in part into a particular machine or apparatus (e.g. a network router having the functionality taught by the present disclosure). The executable instructions may be stored on the memory 1222 and loaded into the processor 1220 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and random access memory (RAM)). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a first transceiver unit (TU) for coupling to a first subscriber line;
a second TU for coupling to a second subscriber line; and
a processor coupled to the first TU and the second TU, wherein the processor is configured to:
receive a link state transition request from the first TU;
generate for the first TU an active symbol indicator (ASI) based on service requirements of the first TU and second TU in response to the link state transition request, wherein the ASI specifies whether data shall be transmitted in positions of one or more symbols, and wherein a modulator input is zero during one or more inactive symbols;

determine a link state in which data transmission is disabled for a duration of one or more symbols in a superframe;
instruct the first TU to operate in the determined link state; and
coordinate data transmission by the first TU and the second TU to avoid an increase of crosstalk from the first subscriber line to the second subscriber line due to the first TU operating in the determined link state.

2. The apparatus of claim 1, wherein a combination of the first subscriber line and the second subscriber line comprises a vectored group of subscriber lines, and wherein coordinating data transmission comprises updating crosstalk cancellation matrices for the vectored group of subscriber lines based on a number of TUs transmitting data onto corresponding subscriber lines during periods of one or more symbols.

3. The apparatus of claim 2, wherein the processor comprises a vectoring control entity (VCE) configured to adjust a size of the crosstalk cancellation matrices to be equal to or less than the number of TUs transmitting data onto corresponding subscriber lines during one or more of the periods of the one or more symbols.

4. The apparatus of claim 3, wherein the processor is further configured to:
determine one or more symbol positions during which only one of the first TU and the second TU is transmitting data onto a corresponding subscriber line; and
turn off functions of the VCE to disable crosstalk cancellation.

5. The apparatus of claim 3, further comprising a superframe counter, wherein updating the crosstalk cancellation matrices by the VCE is implemented at about the same superframe count as when the first TU enters the determined link state.

6. The apparatus of claim 2, wherein the first TU comprises:
a digital signal processor (DSP);
an analog front end (AFE) coupled to the DSP; and
a line driver coupled to the AFE, and
wherein the first TU is configured to keep at least one of the DSP, the AFE, or the line driver turned off when operating in the determined link state.

7. The apparatus of claim 1, wherein the first TU comprises a rate monitor module configured to:
monitor traffic through the first TU;
determine a data rate on the first subscriber line based on the monitored traffic, wherein the data rate is less than a full data rate; and
initiate the link state transition request, and
wherein the ASI is generated based at least in part on the determined data rate.

8. The apparatus of claim 1, further comprising a receiver coupled to the processor and configured to receive a second link state transition request from a customer premise equipment (CPE), wherein the link state is determined in response to the received second link state transition request.

9. The apparatus of claim 1, wherein the processor comprises a power control entity (PCE), wherein the PCE is configured to:
monitor an internal or external supply of power to the apparatus; and
determine that the supply of power is lower than a threshold,
wherein the link state is a deep power saving mode determined based upon the supply of power being lower than the threshold, and wherein the first TU is configured to keep at least an analog front end (AFE) and a line driver turned off when operating in the deep power saving mode.

10. The apparatus of claim 1, wherein the processor is further configured to:
monitor service traffic requirements of the first TU and the second TU; and
determine that a sum of service traffic for the first TU and the second TU over a period is equal to or less than 100% of the nominal capacity over the period of a single subscriber line, and
wherein the data transmission by the first TU and the second TU is coordinated based upon the sum being equal to or less than 100% of the nominal capacity of a single line such that no more than one TU transmits during any given symbol position in the superframe.

11. The apparatus of claim 1, wherein the processor is further configured to notify the first TU to reconfigure parameter information via online reconfiguration (OLR) upon entering the determined link state, and wherein the parameter information includes at least one of: bit allocation, gain allocation, transmit spectrum shaping, actual data rate, actual size of forward error correcting codeword, actual number of forward error correcting code redundancy bytes, or actual number of bits per symbol.

12. The apparatus of claim 1, wherein the first TU and the second TU are G.Fast Transceiver Units on a network side (FTU-Os) located in a Distribution Point Unit (DPU), wherein the determined link state is one of a plurality of link states available for operation by the FTU-Os, and wherein the plurality of link states comprise a full power state denoted as L0, a reduced power state denoted as L2.0, a low power state denoted as L2.1, a standby low power state denoted as L2.2, and an idle state denoted as L3 according to the G.fast standard.

13. A method for power management implemented by a network device, the network device comprising a plurality of time-division duplexing (TDD) transceiver units (TUs) for coupling to a plurality of subscriber lines, the method comprising:
receiving a link state transition request from a first TU of the plurality of TUs;
generating for the first TU an active symbol indicator (ASI) based on service requirements of the first TU in response to the link state transition request, wherein the ASI specifies whether data shall be transmitted in positions of one or more symbols, and wherein a modulator input is zero during one or more inactive symbols;
determining a power management state in which the first TU shall not transmit data for a duration of one or more symbols in a superframe; and
updating vectoring coefficients used by the plurality of TUs to avoid an increase of far end crosstalk (FEXT) among the plurality of subscriber lines due to transitioning of the first TU to the power management state.

14. The method of claim 13, further comprising transitioning the first TU to the power management state synchronously with updating the vectoring coefficients used by the plurality of TUs, and wherein the vectoring coefficients comprises at least precoder coefficients.

15. The method of claim 13, further comprising:
monitoring data traffic through a second TU of the plurality of TUs; and
determining a data rate based on the monitored traffic, wherein the power management state is determined based on the data rate.

16. The method of claim 13, further comprising:
monitoring an internal or external supply of power to the network device;
determining that the supply of power is lower than a threshold; and
transitioning the first TU to the power management state, wherein the power management state is a deep power saving mode in which an analog front end and a line driver in the first TU is turned off.

17. The method of claim 13, further comprising:
monitoring service traffic requirements of the plurality of TUs;
determining that a sum of service traffic requirements for the plurality of TUs is equal to or less than 100% of the nominal capacity of a single line; and
coordinating, based on the determination that the sum is equal to or less than 100% of the nominal capacity of a single line, transmission by the plurality of TUs so that no more than one TU transmits during each symbol position in a plurality of symbol positions.

18. The method of claim 13, further comprising reconfiguring parameter information for the first TU via online reconfiguration (OLR) upon transitioning to the power management state, wherein the parameter information includes at least one of: bit allocation, gain allocation, transmit spectrum shaping, actual data rate, actual size of forward error correcting codeword, actual number of forward error correcting code redundancy bytes, or actual number of bits per symbol.

19. The method of claim 13, further comprising receiving a state transition request from a customer premise equipment (CPE), wherein the state transition request comprises information indicating a data rate at the CPE, and wherein the power management state is determined based on the date rate at the CPE.

20. A Distribution Point Unit (DPU) comprising:
a plurality of G.Fast Transceiver Units on a network side (FTU-Os) for coupling to a vectored group of subscriber lines, wherein the FTU-Os are configured to operate in a discontinuous operation interval during which not all data symbol positions available are used by the FTU-Os to transmit data onto the vectored group of subscriber lines; and
a Vectoring Control Entity (VCE) configured to:
receive a link state transition request from a first FTU-O of the plurality of FTU-Os;
generate for the first FTU-O an active symbol indicator (ASI) based on service requirements of the first FTU-O in response to the link state transition request, wherein the ASI specifies whether data shall be transmitted in positions of one or more symbols, and wherein a modulator input is zero during one or more inactive symbols; and
adjust crosstalk cancellation matrices for the plurality of FTU-Os during the discontinuous operation interval based on a number of subscriber lines in the vectored group containing data symbols.

21. The DPU of claim 20, wherein a size of the crosstalk cancellation matrices is adjusted by the VCE to be equal to or less than the number of subscriber lines containing data symbols.

22. The DPU of claim 20, further comprising a management entity (ME) configured to:
determine, in the discontinuous operation interval, one or more data symbol positions during which only one of the plurality of FTU-Os is transmitting data onto a corresponding subscriber line; and
disable crosstalk cancellation by instructing the VCE to turn off all vectoring functions.

23. The DPU of claim 20, wherein the first FTU-O comprises a rate monitor module configured to:
monitor traffic through the first FTU-O; and
determine a data rate on a subscriber line coupled to the first FTU-O based on the monitored traffic,
wherein the data rate is less than a full data rate, and
wherein the DPU is configured to transition the first FTU-O to a link state during the discontinuous operation interval based on the determined data rate.

24. The DPU of claim 20, further comprising a power control entity (PCE), wherein the PCE is configured to:
monitor an internal or external supply of power to the DPU; and
determine that the supply of power is lower than a threshold,
wherein the DPU is configured to transition to a deep power saving mode based upon the supply of power being lower than the threshold, and
wherein each of the plurality of FTU-Os keep at least an analog front end (AFE) turned off in the deep power saving mode.

25. The DPU of claim 20, wherein the discontinuous operation interval comprises at least one empty symbol position reserved for initialization of a new subscriber line to be coupled to the DPU, and wherein the DPU is configured to allow only an FTU-O coupled to the new subscriber line to transmit data in the at least one empty symbol position.

26. A method implemented by a Distribution Point Unit (DPU) comprising a first G.Fast Transceiver Unit on a network side (FTU-O) coupled to a subscriber line, the method comprising:
receiving a link state transition request from the first FTU-O;
generating for the first FTU-O an active symbol indicator (ASI) based on service requirements of the first FTU-O in response to the link state transition request, wherein the ASI specifies whether data shall be transmitted in positions of one or more symbols, and wherein a modulator input is zero during one or more inactive symbols;
determining a first number of symbol positions in which the first FTU-O shall be active and a second number of symbol positions in which the first FTU-O shall be inactive, wherein the first number of symbol positions and the second number of symbol positions belong to one or more time-division duplexing (TDD) frames of a superframe;
transmitting data, by the first FTU-O, onto the subscriber line in the first number of symbol positions; and
keeping at least part of the first FTU-O turned off such that the first FTU-O does not transmit data onto the subscriber line in the second number of symbol positions.

27. The method of claim 26, wherein the DPU further comprises a second FTU-O, wherein the first FTU-O and the second FTU-O are coupled to a vectored group of subscriber lines, and wherein the method further comprises:
operating the first FTU-O and the second FTU-O in a discontinuous operation interval during which not all data symbol positions available are used by the first FTU-O and the second FTU-O to transmit data onto the vectored group of subscriber lines; and
adjusting, by using a Vectoring Control Entity (VCE), crosstalk cancellation among the vectored group during the discontinuous operation interval based on a number of subscriber lines containing data symbols in the vectored group.

28. The method of claim 26, wherein the first FTU-O comprises:
 a digital signal processor (DSP);
 an analog front end (AFE) coupled to the DSP; and
 a line driver coupled to the AFE, and
 wherein keeping at least part of the first FTU-O turned off comprises keeping the AFE and the line driver turned off.

29. A network system comprising:
 a time-division duplexing (TDD) transmission system that comprises a plurality of G.Fast Transceiver Units on a network side (FTU-Os) for coupling to a vectored group of subscriber lines, wherein the TDD transmission system is configured to:
  generate for a first FTU-O of the plurality of FTU-Os an active symbol indicator (ASI) based on service requirements of the first FTU-O in response to a link state transition request, wherein the ASI specifies whether data shall be transmitted in positions of one or more symbols, and wherein a modulator input is zero during one or more inactive symbols;
  determine a link state that specifies one or more active symbol positions and inactive symbol positions for the first FTU-O; and
  transition, without directly causing an increase of far end crosstalk (FEXT) among the vectored group of subscriber lines, the first FTU-O to the link state in which data is transmitted during the active symbol positions but not the inactive symbol positions in a superframe; and
 a customer premise equipment (CPE) for coupling to one of the vectored group of subscriber lines, wherein the CPE is configured to receive data from the first FTU-O during the active symbol positions but not the inactive symbol positions in the superframe.

30. The network system of claim 29, wherein the CPE is further configured to send a second link state transition request to the TDD transmission system based upon a data rate at the CPE lower than a threshold, and wherein the link state is determined by the TDD transmission system based on the data rate at the CPE.

* * * * *